(12) United States Patent
Tsuruta

(10) Patent No.: US 12,243,136 B2
(45) Date of Patent: Mar. 4, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Hirofumi Tsuruta, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 192 days.

(21) Appl. No.: 18/064,445

(22) Filed: Dec. 12, 2022

(65) Prior Publication Data

US 2023/0186540 A1 Jun. 15, 2023

(30) Foreign Application Priority Data

Dec. 15, 2021 (JP) ................................ 2021-203717

(51) Int. Cl.
*G06T 11/60* (2006.01)
*G06T 7/30* (2017.01)

(52) U.S. Cl.
CPC .............. *G06T 11/60* (2013.01); *G06T 7/30* (2017.01)

(58) Field of Classification Search
None
See application file for complete search history.

(56) References Cited

U.S. PATENT DOCUMENTS

| | | | |
|---|---|---|---|
| 5,123,087 A | 6/1992 | Newell et al. | |
| 2006/0059427 A1* | 3/2006 | Reid | G06F 16/58 715/250 |
| 2006/0200758 A1* | 9/2006 | Atkins | G06T 11/60 715/209 |
| 2019/0379795 A1* | 12/2019 | Yamaji | H04N 1/00143 |
| 2021/0042001 A1 | 2/2021 | Tsuruta | |
| 2022/0337709 A1 | 10/2022 | Tsuruta | |

FOREIGN PATENT DOCUMENTS

| | | |
|---|---|---|
| JP | 2021-026705 A | 2/2021 |
| WO | 91/17512 A1 | 11/1991 |

* cited by examiner

*Primary Examiner* — Jeffrey J Chow
(74) *Attorney, Agent, or Firm* — Venable LLP

(57) ABSTRACT

An information processing method includes obtaining arrangement information on an object already arranged on a second page, which is different from a first page being edited, wherein, in the obtaining, if there is a first object that is already arranged on the first page, the obtaining obtains arrangement information on the first object, and snapping an edit-target object on the first page based on the obtained arrangement information on the object, wherein, in the snapping, if snapping is possible based on the information on the first object, the edit-target object is snapped, based on the arrangement information on the first object, without using the arrangement information on a second object, which is the object already arranged on the second page.

17 Claims, 19 Drawing Sheets

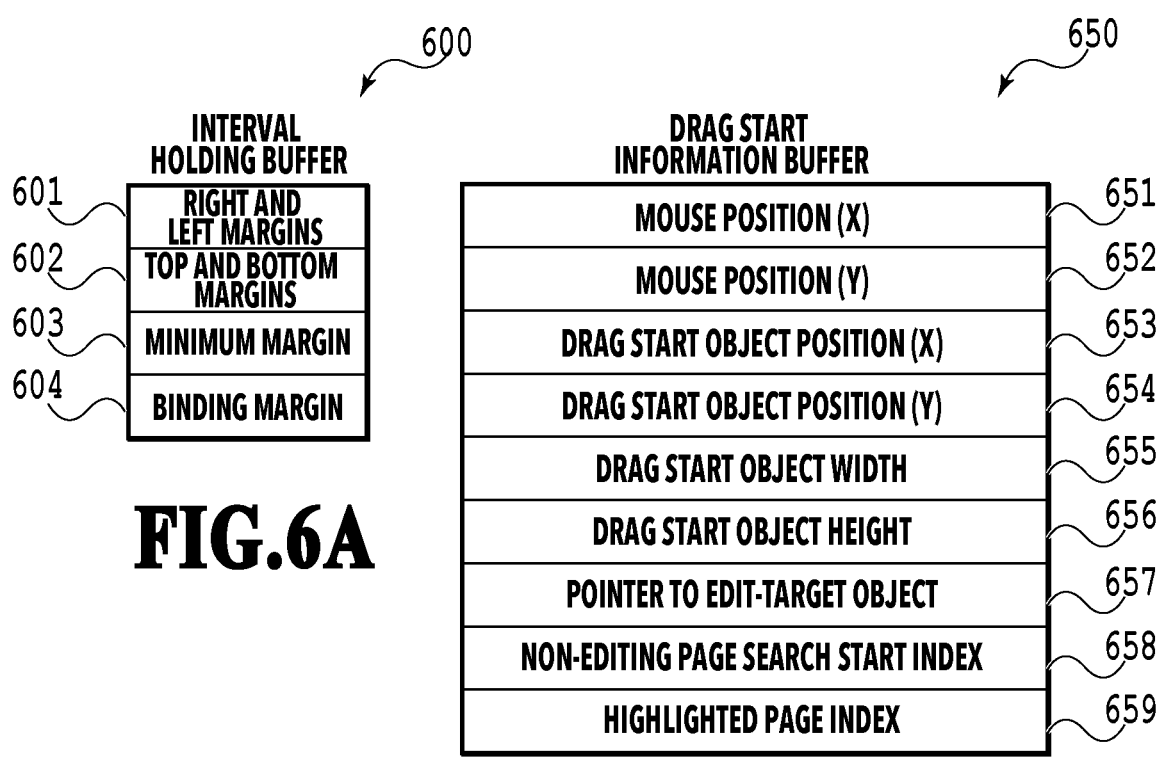

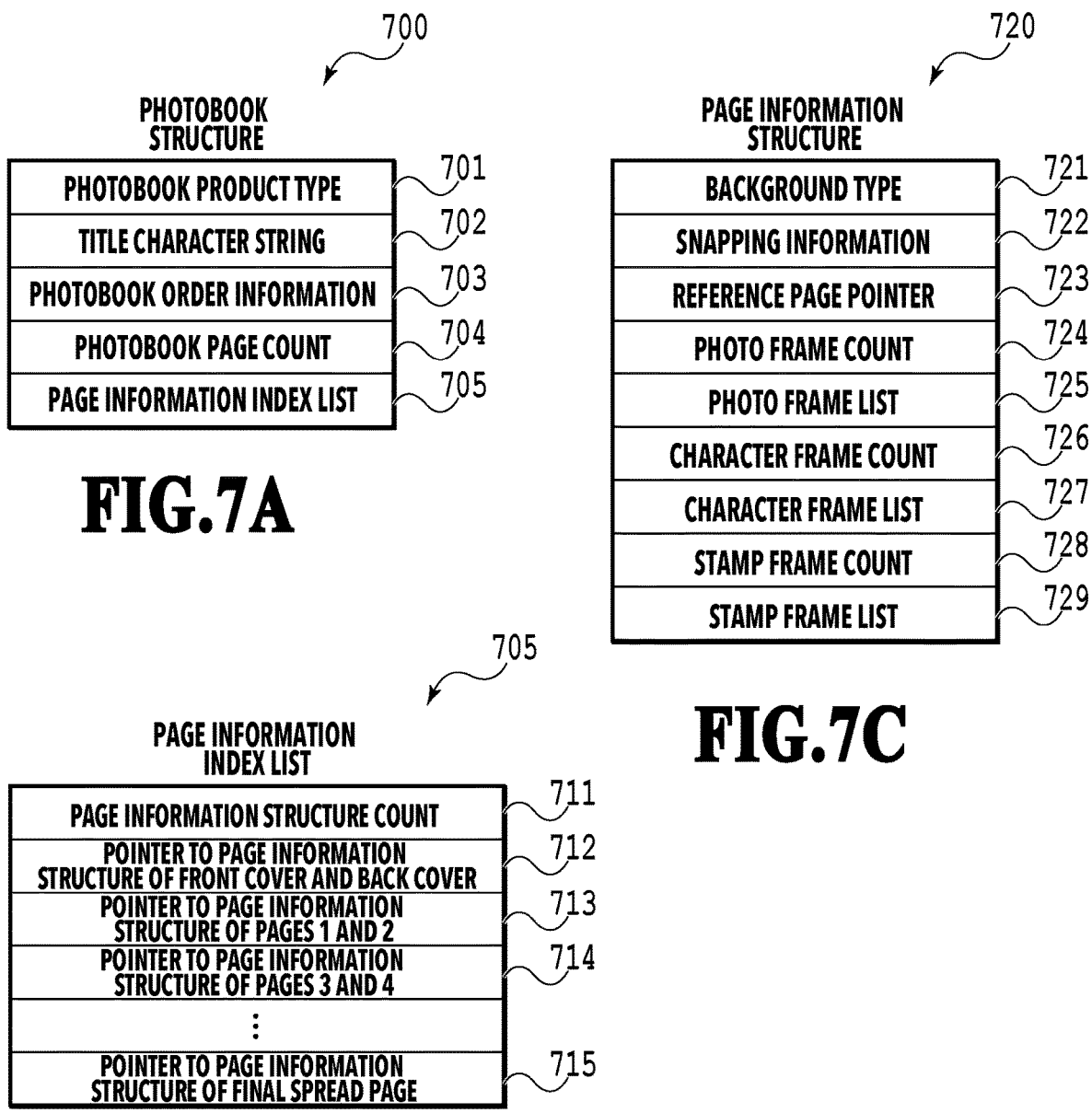

INFORMATION PROCESSING APPARATUS, INFORMATION PROCESSING METHOD, AND STORAGE MEDIUM

CROSS REFERENCE TO PRIORITY APPLICATION

This application claims the benefit of Japanese Patent Application No. 2021-203717, filed Dec. 15, 2021, which is hereby incorporated by reference herein in its entirety.

BACKGROUND OF THE INVENTION

Field of the Invention

The present disclosure relates to editing technology for arranging objects.

Description of the Related Art

In the field of presentation document creation software, CAD software, and the like, a technique called object snapping is known as a technique for improving operability in user operations for arranging objects on a layout surface. Object snapping is a technique for accurately arranging an endpoint, a midpoint, or the like, of an object to be operated at a predetermined point during user-operated arrangement or rearrangement of objects corresponding to adding, moving, enlarging, or shrinking objects. This predetermined point is also called a snapping point. International Laid-Open No. WO91/17512 (hereafter referred to as the '512 document) discloses an object snapping technology in the field of CAD systems for automatically aligning the endpoints or midpoints of an object to be arranged with a point of interest such as the endpoints or midpoints of other already arranged objects. For example, if the top, bottom, left, or right edge or the center point of a moving object approaches the alignment point (snapping point) by mouse drag, or the like, the object is automatically aligned with the alignment point. Further, if the mouse is continued to be dragged and leaves the region determined to be nearby, normal movement is resumed.

In addition, Japanese Patent Laid-Open No. 2021-26705 (hereafter referred to as the '704 document) discloses a technology that scans all objects on a page that serves as an editing region and performs snapping using the top, bottom, left, and right margins, the binding margins, or the interval between objects.

There is a demand for further functional improvements in editing processing.

SUMMARY OF THE INVENTION

An information processing method according to an aspect of the present disclosure includes obtaining arrangement information on an object already arranged on a second page that is a page different from a first page being edited, and snapping an edit-target object in the first page based on the obtained arrangement information on the object.

Further features of the present invention will become apparent from the following description of exemplary embodiments with reference to the attached drawings.

BRIEF DESCRIPTION OF THE DRAWINGS

FIG. 5 is a diagram showing the relationship of FIGS. 5A and 5B;

FIGS. 6A and 6B are each a diagram illustrating an example of the data structure stored in the buffer region;

FIGS. 7A, 7B, and 7C each illustrates an example of the data structure of a photobook;

DESCRIPTION OF THE EMBODIMENTS

Preferred embodiments of the present disclosure are described in detail below with reference to the accompanying drawings. It should be noted that the following embodiments do not limit the matters of the present disclosure, and not all combinations of features described in the present embodiments are essential for the solution of the present disclosure.

First Embodiment

First, an overview of an example of functional improvements of object snapping described in the present embodiment is described, and then the configuration of the present embodiment is described. Object snapping is sometimes simply referred to as snapping. An object is an object such as a picture or a figure. The figures may include figures such as characters or stamps. In the present embodiment, photo objects (image objects) are mainly described as objects subjected to snapping operations (alignment and registration operations). An object to be snapped (for example, an already-arranged object) is also described using a photo object as an example. However, the object is not limited to the above examples, and any type of object may be used as long as it can be arranged in the editing region.

As described above, object snapping is a mechanism that assists the user in aligning the positional relationship with an existing object in a case of adding or moving an object in editing a document, for example. In other words, object snapping is a mechanism where the program automatically arranges an object by automatically changing the position designated by the user as the position of the object based on the positional relationship with the existing object. For this reason, in a case of starting to create a new page, there occurs a situation where the editing region has no other arranged objects, or has a small number of arranged objects. Under such situations, the snapping function does not work effectively.

In view of this, in the present embodiment, if the snapping point cannot be obtained because the object has not yet been arranged on the page being edited, snapping is performed using the arrangement information on the object in a page different from the page being edited. Note that, in the present embodiment, as described later, a two-page-region spread is displayed on the editing screen. Here, a page different from the page being edited is a page included in a spread different from the spread being edited. An example of performing "snapping utilizing a non-editing page" using an existing created page is described below.

<System Configuration>

Figure 1:
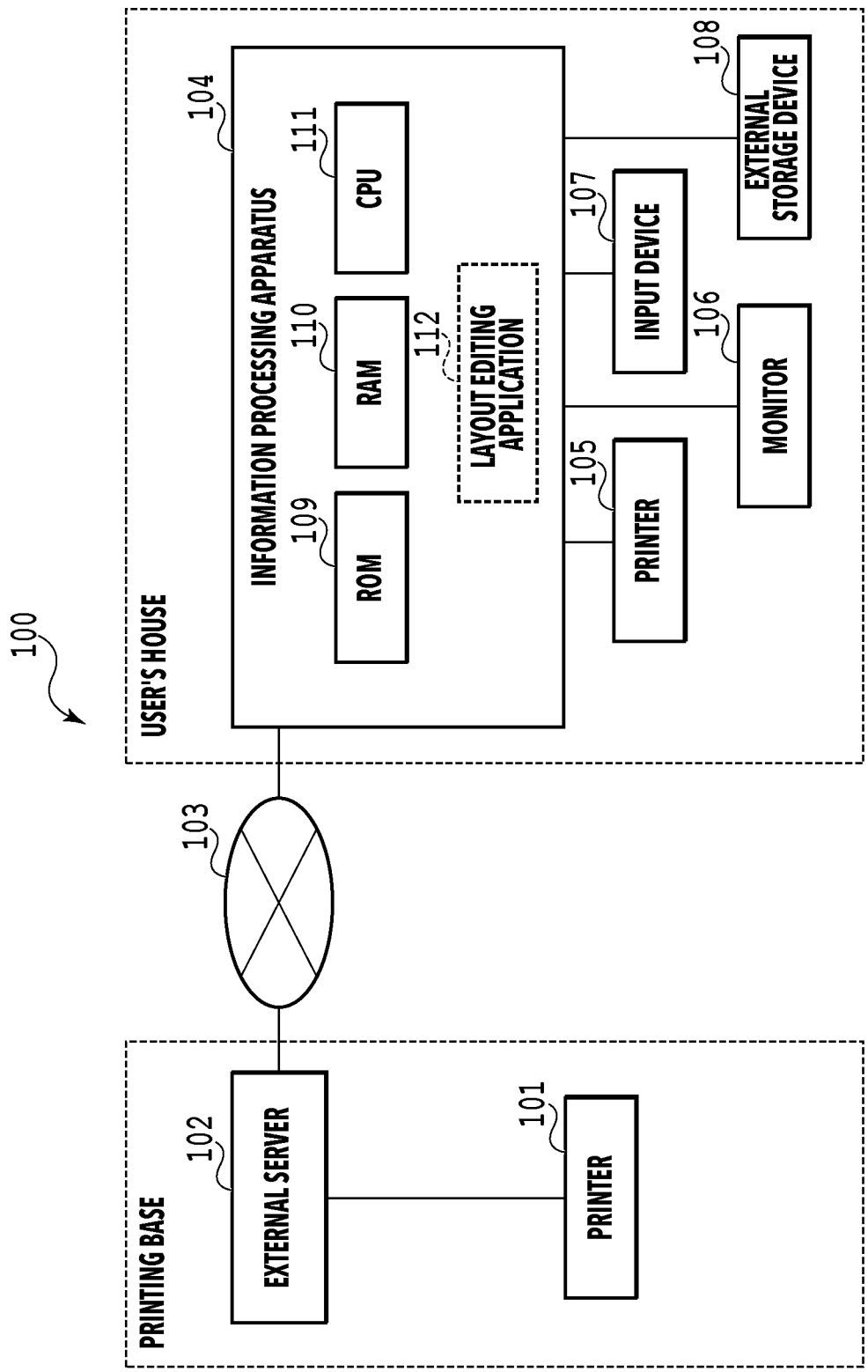
FIG. 1 is a diagram illustrating an example of an information processing system.

FIG. 1 is a diagram illustrating an example of an information processing system according to the present embodiment. In the present embodiment, a photobook order placement system for ordering photobooks is mainly described as an example. The information processing system 100 includes an information processing apparatus 104 used in, for example, a user's home, and an external server 102 and a printer 101 installed at a printing base. The information processing apparatus 104 and the external server 102 are connected through a network 103 such as the Internet. In the present embodiment, the information processing apparatus 104 orders a photobook from a photobook production company (printing base) having the printer 101 for photobook production.

The information processing apparatus 104 is an information processing apparatus such as a personal computer (PC), a tablet, or a smart phone. The information processing apparatus 104 is connected to a monitor 106, an input device 107, and an external storage device 108. The information processing apparatus 104 is also connected to a printer 105 installed in the user's home. The information processing apparatus 104 includes a CPU 111, a ROM 109, and a RAM 110. The external storage device 108 is a storage device such as an HDD or an SSD that stores image data or templates. The monitor 106 is a display device. In the example in FIG. 1, the information processing apparatus 104, the monitor 106, the input device 107, and the external storage device 108 are described as separate devices, but depending on the form of the information processing apparatus 104, some or all of these may be integrated. That is, the information processing apparatus 104 may be of a form that includes, as its configurations, a monitor 106, an input device 107, and an external storage device 108 (which may be shared with the RAM 110 of the information processing apparatus). Further, depending on the form of the input device 107, it may be of a form that is integrated with the monitor 106, and uses a touch panel for input through direct touch on the monitor.

The layout editing application 112 is an application for editing photobooks and is installed on the information processing apparatus 104. In the information processing apparatus 104, the CPU 111 reads the layout editing application 112 stored in the ROM 109, the external storage device 108, or the like, into the RAM 110 and executes that application. As a result, the information processing apparatus 104 executes various processes including object snapping, which is described later. The information processing apparatus 104 displays a user interface provided by the layout editing application 112 on the monitor 106.

The layout editing application 112 processes information inputted from an input device 107 (such as a mouse, a keyboard, a touch panel, a remote pointer device equipped with a gyro, or an input method using a gyro of a smartphone main body). The layout editing application 112 feeds back the processed information on the monitor 106 again. The present embodiment mainly describes some of the functions of the portion called the user interface of the layout editing application 112. Note that the present embodiment describes an example when the layout editing application 112 is installed in the information processing apparatus 104, but it may operate as a web application that operates on a web browser. In the case of a web application, installation on the information processing apparatus 104 is automatically triggered by web browsing.

The present embodiment describes the layout editing application 112 as a photobook production application. That is, the layout editing application 112 is an application for printing images taken with a digital camera, or the like, on a photobook, or the like. Alternatively, the layout editing application 112 is an application that performs layout on an electronic device such as a computer following the format of a photobook in order to display photos in an easy-to-read manner. In addition, object snapping that assists the user in easily creating a well-ordered layout in such a layout editing application 112 will be described.

<Layout Editing Screen>

Figure 2:
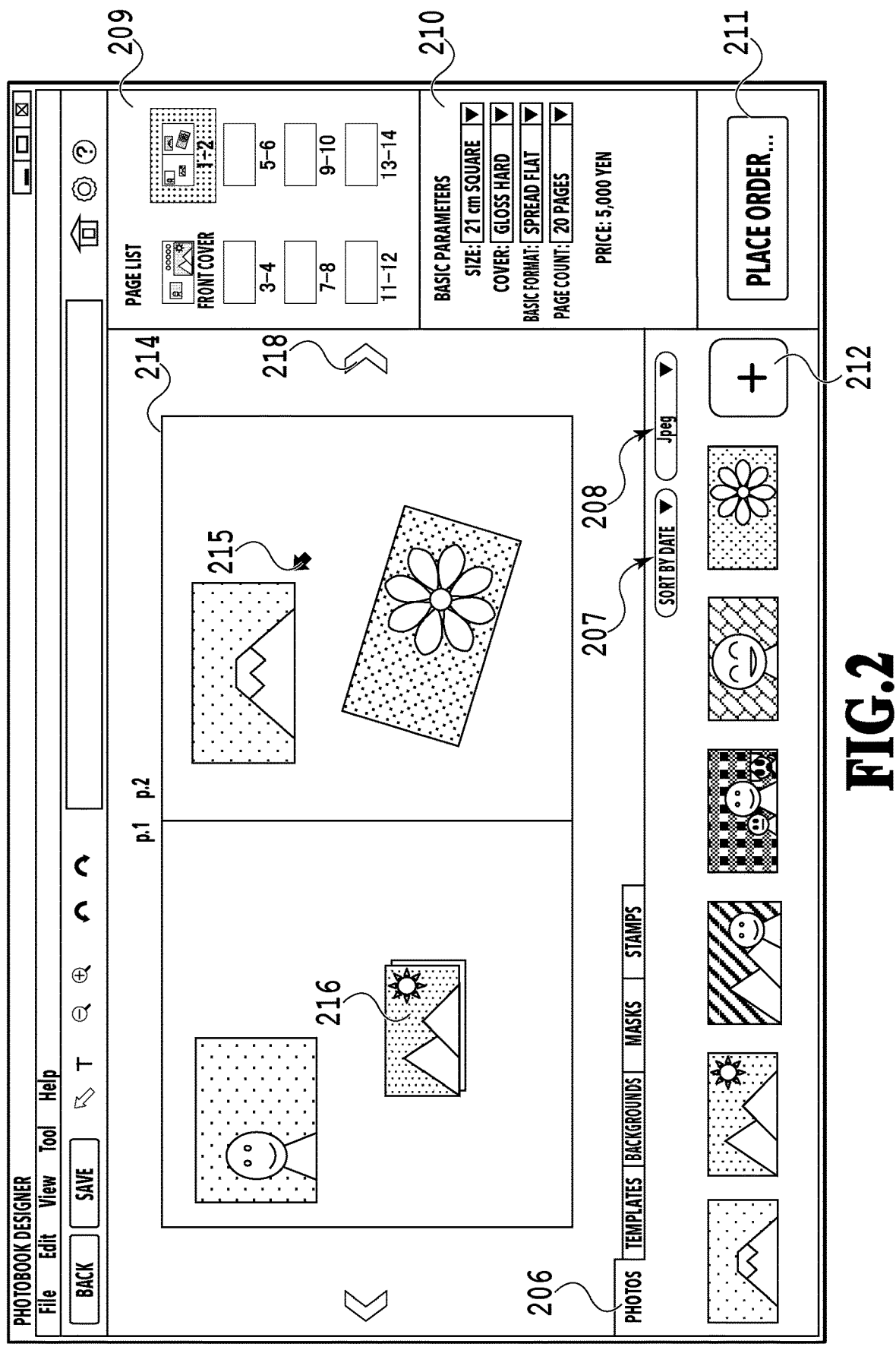
FIG. 2 is a diagram illustrating an example of a layout editing screen.

FIG. 2 is a diagram illustrating an example of a layout editing screen displayed on the monitor 106 by the layout editing application 112. FIG. 2 is used to describe the process of ordering a photobook by a user using the information processing system 100 illustrated in FIG. 1. The present embodiment describes the process of starting to create a new photobook as an example, but it may be the process of re-editing a photobook that has already been created in the layout editing application 112.

In a case of starting to create a new photobook, the layout editing application 112 is activated in a state when regions other than the setting region of the bookbinding parameters 210 in FIG. 2 are grayed out (input disabled). As described later, FIG. 2 illustrates a layout editing screen where some pages have been edited.

The user operates the input device 107 to move the cursor 215. Further, the user can freely select the bookbinding parameters 210 by operating the input device 107 and performing a determination operation (such as mouse click). The bookbinding parameters 210 include the size of the photobook (such as twenty-one cm square and A4 portrait) and the type of cover (such as hard cover and soft cover). It also includes a bookbinding format (such as standard and flat), a sheet type (such as glossy paper and semi-glossy paper), and a number of pages (such as twenty pages and thirty pages). Once the bookbinding parameters 210 are all selected, the price of the photobook is calculated and displayed.

The layout editing screen includes a page list region 209. Once the bookbinding parameter 210 is selected, the page list region 209 is ungrayed to display a page list matching the designated bookbinding information. If the user selects a page they wish to edit, the layout editing application 112 displays the designated page in the layout editing region 214 and waits for editing. In the page list region 209, the periphery of the page having entered the edit status is highlighted in gray (indicated by hatching in the figure). In the example in FIG. 2, the spread corresponding to page one and page two are illustrated in an edit status.

Note that "spread" or "spread page" corresponds to, for example, one display window in a case of display, and corresponds to a pair of adjacent pages (that is, two pages) that can be viewed by the user at a time if a book is opened in a case of a printed product. Note that the two pages in a spread may be formed by binding different printed sheets adjacent to each other to form a spread, or by folding a single printed sheet in the middle to form a spread. Note that, in the present embodiment, the editing screen displays a spread, but may display a single page.

If the user presses a photo loading button 212 to cause the layout editing application 112 to load the photo as the material of the photobook, a file selection dialog is opened as an operating system (OS) function. The user selects any photo from photos stored on the information processing apparatus 104 (external storage device 108 or RAM 110) or in a storage via the network 103. The selected photo is displayed as a photo object on photo list region 206. The user can arrange the photo object on the spread page by dragging and dropping the desired photo object from the photo list region 206 onto the spread page displayed in the layout editing region 214.

If the order button 211 is pressed to order a photobook, the photobook data created by the information processing apparatus 104 is uploaded to the external server 102 via the network 103. The external server 102 outputs the uploaded data to the printer 101. For example, the external server is a photobook order-management server, where the user uploads a photobook created with their own information processing apparatus 104, and the printer 101 outputs the photobook after the necessary photobook purchase procedures are completed. After that, the outputted printed product is bound and delivered to the user. Note that instead of uploading to an external server, the user may create a photobook by printing with their own printer 105 and binding the photobook by the user themselves.

Figure 3:
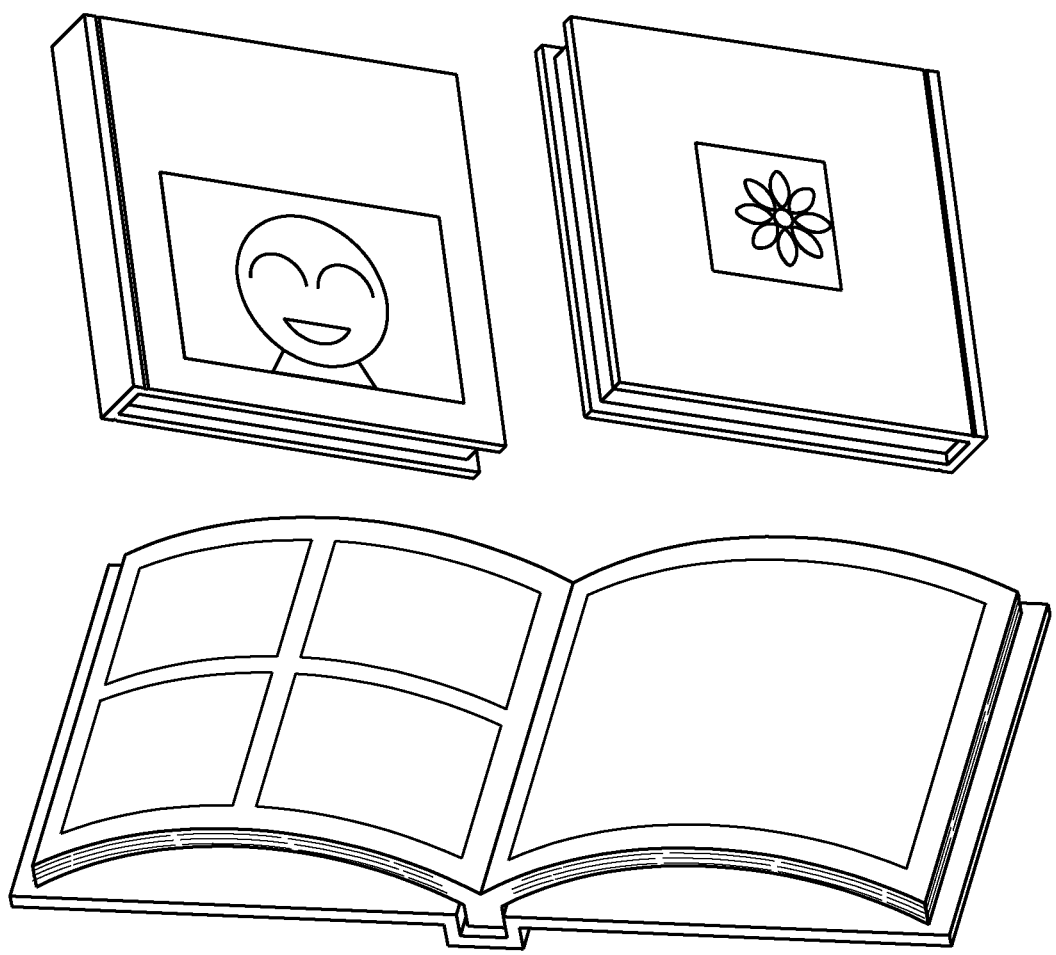
FIG. 3 is a diagram illustrating an example of a photobook.

FIG. 3 is a diagram illustrating an example of a photobook outputted by the printer 101 and bound. By performing various layout editing using the layout editing application 112 and ordering a photobook, the user can obtain a photobook as illustrated in FIG. 3. The above is a description of the schematic configuration and processing performed in the information processing system 100.

As described above, the layout editing application 112 displays an editing screen through the monitor 106, and the user uses the input device 107 to perform photobook layout work while viewing this screen. Object snapping is a useful feature for the user in performing layout work. Object snapping processing for photobook layout editing is also described, for example, in the '705 document mentioned above.

Here, object snapping generally refers to the operation of aligning the positions of objects within a work region being edited. In other words, processing is performed to generate positions to be snapped (snapping points) using the positional information on the objects existing in the work region being edited. In the case of the layout editing application 112, the work region being edited is the layout editing region 214 of FIG. 2. That is, in a case of a photobook, the spread page displayed as the layout editing region 214 corresponds to the work region being edited. Note that, although the example in FIG. 2 illustrates an example where the entire spread page is displayed, if the layout editing region 214 is enlarged, or if the size of the photobook is large, the entire spread page may not be displayed in the layout editing region 214. In this case, the configuration may be such that a scroll bar is displayed on the layout editing region 214 so as to change the display position. In the present embodiment, for the sake of simplicity of explanation, an example is used where the entire spread page fits within the region of the layout editing region 214.

Next, an example that can occur in a case of performing object snapping in the layout editing application 112 is described first as a comparative example using FIG. 2. FIG. 2 illustrates a state when a spread page corresponding to page one and page two is displayed. In the example in FIG. 2, the spread page includes four photo objects 216 arranged therein. In the example in FIG. 2, based on the already-arranged four photo objects, a region for snapping (hereafter referred to as a snapping region) is calculated. However, in a case of starting to edit a new page, no objects are arranged on the work region. In other words, snapping does not function because no object exists in the work region that serves as a reference for snapping (hereafter referred to as a reference object).

Figure 4:
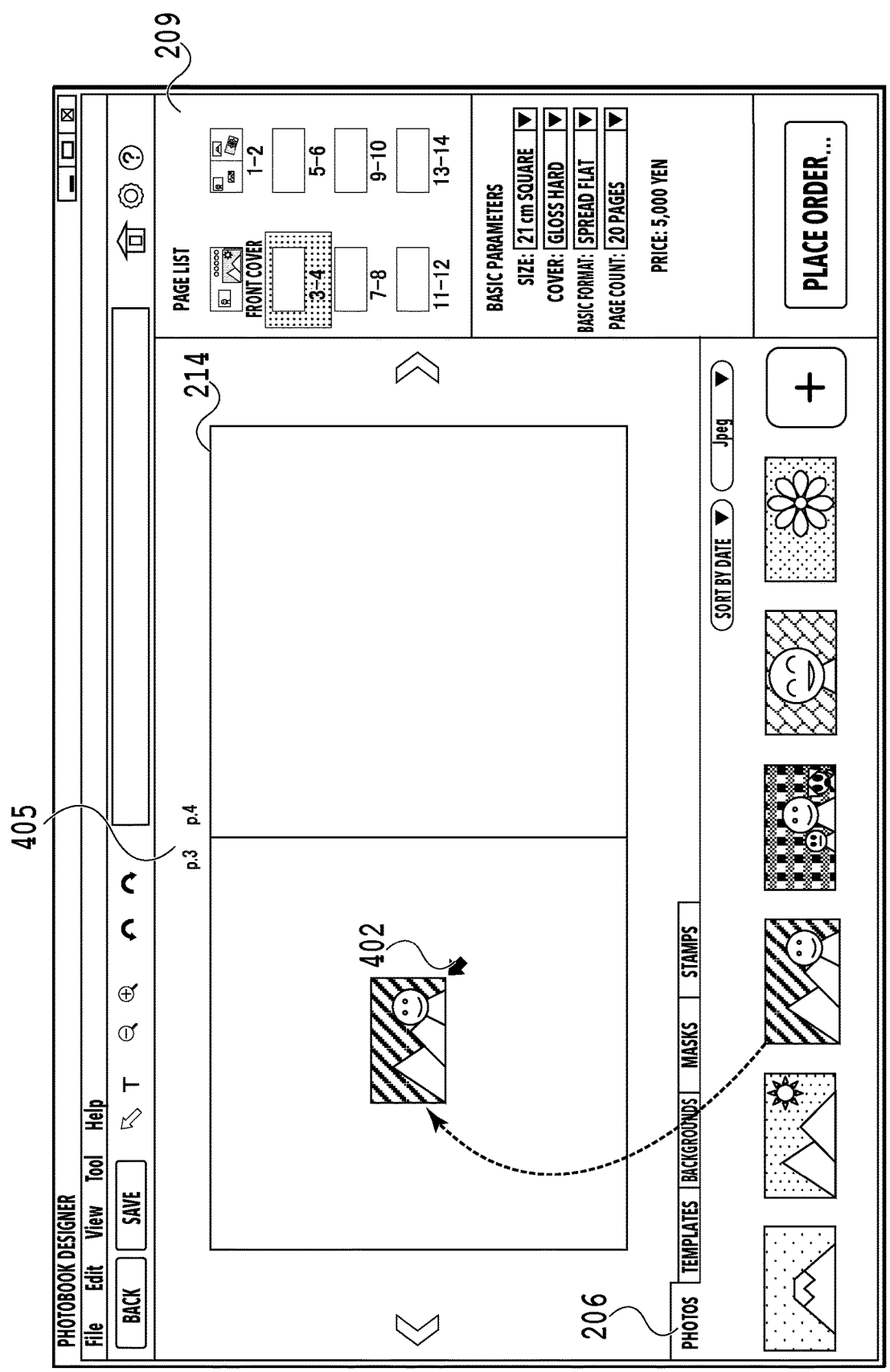
FIG. 4 is a diagram illustrating an example of a layout editing screen.

FIG. 4 is a diagram illustrating an example of the layout editing screen. In the layout editing region 214 of FIG. 4, a spread page of page three and page four is displayed. The screen in FIG. 4 illustrates, for example, a state when the user has pressed the next page move button 218 in FIG. 2 to change the processing to edit the next spread page. In the example in FIG. 4, since no object is arranged in the layout editing region 214, the reference object does not exist. In this case, the snapping function does not work on general editing applications.

The present embodiment describes an example where the user starts editing a new page and uses existing page data (spread page data) to further improve the layout editing processing. Specifically, an example of object snapping using existing spread page data is described.

<Object Snapping>

In order to make it easier to specifically understand the operation in the present embodiment, first, a description is provided from the viewpoint of the user interface. Suppose that, as illustrated in FIG. 2, the user edits the spread page of the photobook corresponding to page one and page two, and four photo objects are arranged on the spread page of the photobook corresponding to page one and page two. Next, the user starts editing the spread page corresponding to page three and page four. Specifically, the user moves the cursor 215 and selects by mouse click the thumbnail image portion of "Pages three to four" in the page list region 209 or clicks the next page move button 218. As a result, as illustrated in FIG. 4, it is assumed that the editing of the spread page corresponding to pages three and four is in progress.

In FIG. 4, the currently displayed page number is displayed in the displayed page number display region 405. In FIG. 4, the page list region 209 displays a thumbnail image of each page of the photobook. In addition, by highlighting the periphery of the thumbnail image of "Pages three to four" in gray, it is indicated that the spread page corresponding to pages three and four is being edited.

In FIG. 4, the user drags and drops from the photo list region 206 displayed at the bottom of the screen to a desired arrangement position in the layout editing region 214 to add a photo object to the spread page being edited. In order to adjust the position or the size of the photo object thus additionally arranged, it is also possible to further edit the additionally arranged photo object using a mouse drag or a touch panel. In the present embodiment, the addition of objects to a spread page immediately after the start of editing and the object snapping functions in editing work are mainly described. In addition, at the same time, processing is performed using spread page data other than the spread page to be edited. Note that, in the present embodiment, it is assumed that the page unit to be processed is a spread page, but processing may be performed by using a page of a photo album as a unit of processing.

Figure 5A:
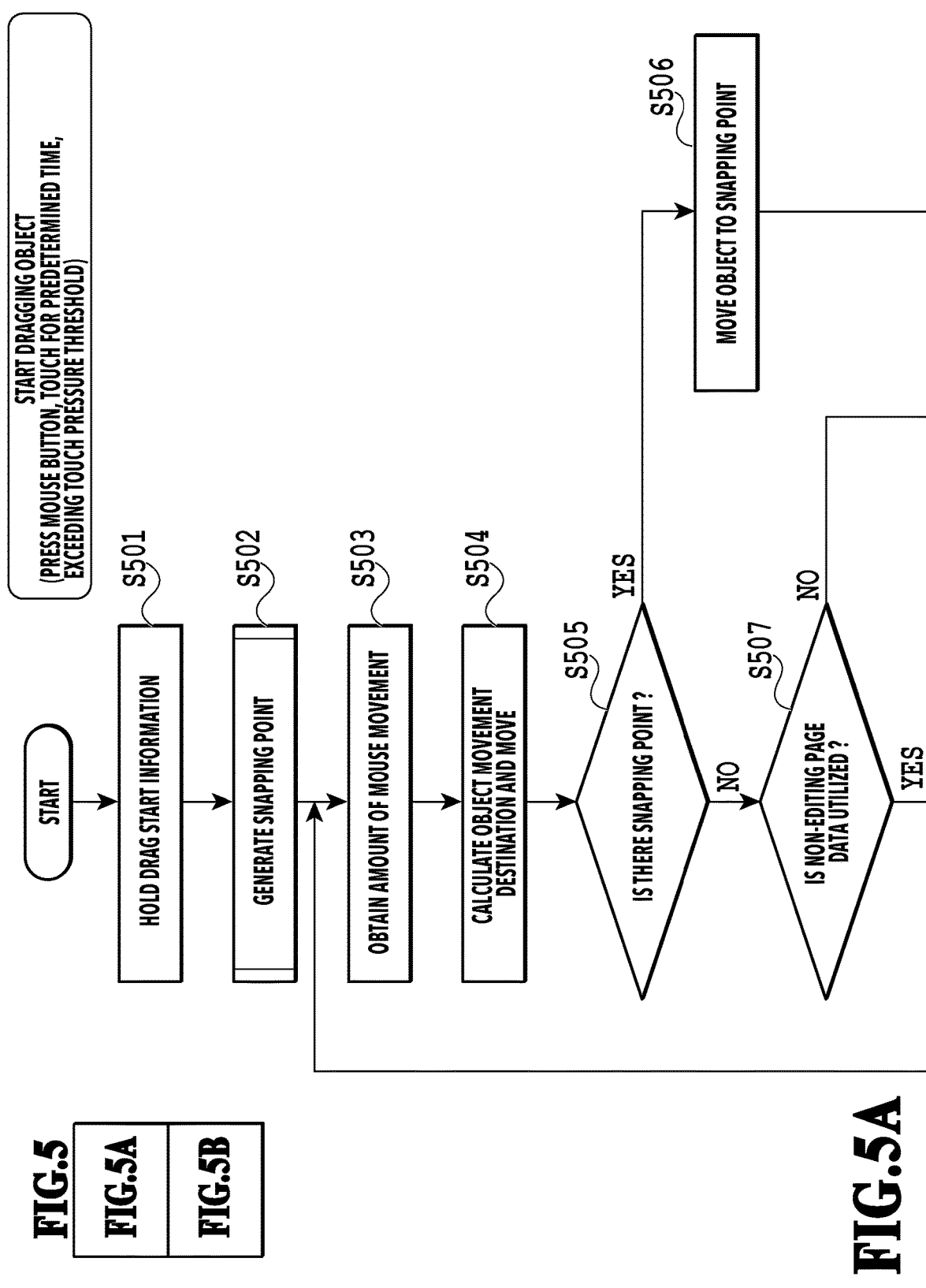
FIGS. 5A and 5B, together, are a flowchart illustrating an example of object snapping processing.
Figure 5B:
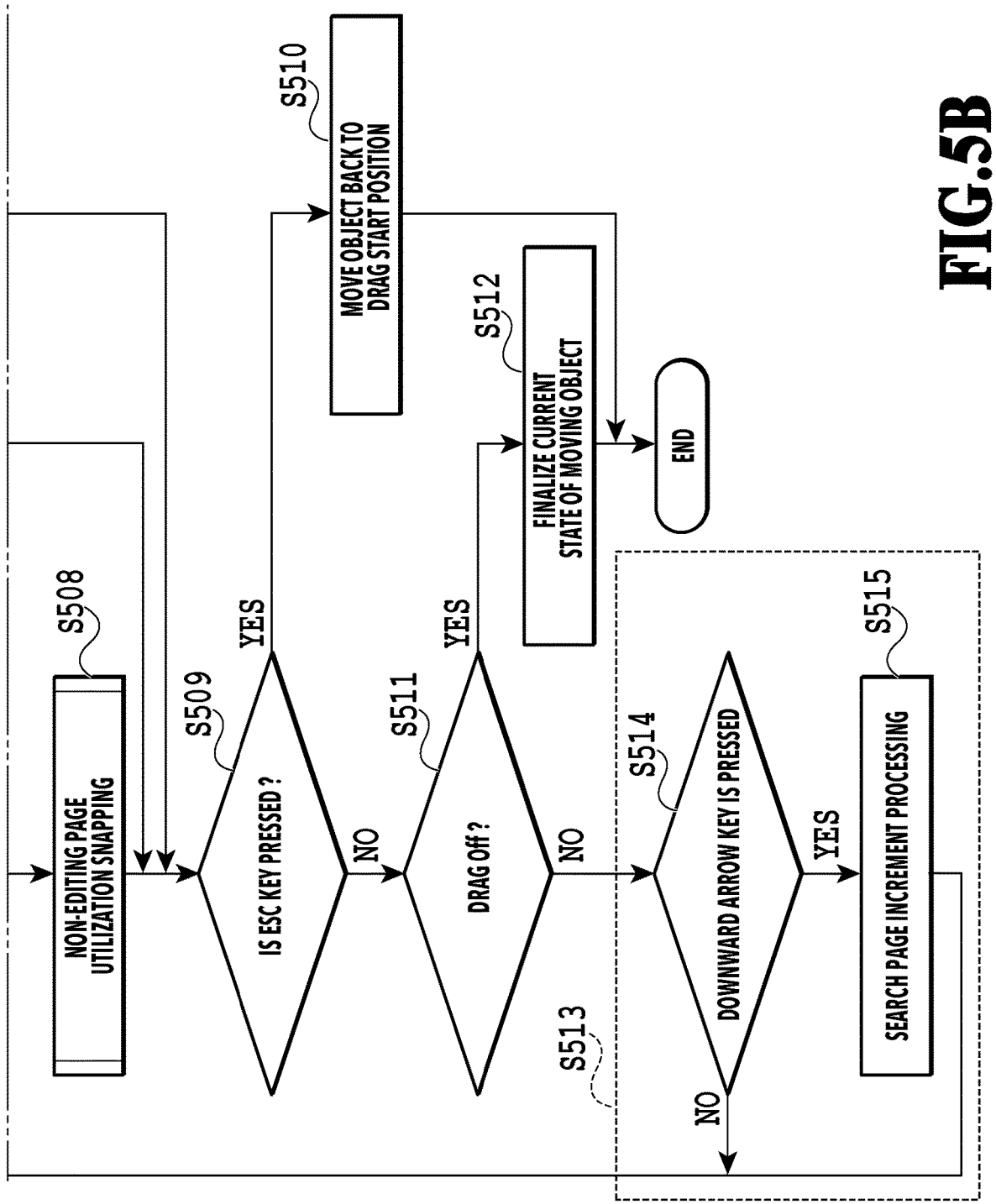

FIGS. 5A and 5B, together, are a flowchart illustrating an example of object snapping processing in the present embodiment. A series of processes illustrated in the flowchart in FIGS. 5A and 5B is performed by the CPU 111 of the information processing apparatus 104 developing a program code stored in the external storage device 108, or the like, into the RAM 110 and executing the program code. That is, it is performed by the CPU 111 executing the program code of the layout editing application 112. In addition, the symbol "S" in the description of each process is a step in the sequence diagram (the same is true in the present specification).

FIGS. 6A and 6B are each a diagram illustrating an example of the data structure stored in the buffer region secured in the RAM 110 if the layout editing application 112 is executed. FIG. 6A is an example of an interval holding buffer 600, and FIG. 6B is an example of a drag start information buffer 650.

FIGS. 7A, 7B, and 7C each illustrates an example of the data structure of a photobook used in editing the layout by layout editing application 112. Photobook data is composed of a photobook structure and includes various data items. FIG. 7A is an example of the data structure of a photobook structure 700. The photobook structure 700 includes a page information index list 705. Page information is the information on the spread page. FIG. 7B is an example of the page information index list 705, one of the items of the photobook structure 700. FIG. 7C is an example of various data structures included in a page information structure 720.

Hereafter, the description of the flowchart in FIGS. 5A and 5B is described with reference to the data structure illustrated in FIGS. 6A and 6B, or FIGS. 7A, 7B, and 7C, as appropriate. Details of the information presented in FIGS. 6A and 6B and FIGS. 7A, 7B, and 7C are described as appropriate in the description of the flowcharts.

If the CPU 111 detects that the user has pressed the mouse button via a signal from the input device 107, the processing of the flowchart illustrated in FIGS. 5A and 5B is started. Note that, in the present embodiment, the timing for starting dragging is the pressing of the mouse button, but the timing is not limited to this. For example, if the input device is a touch panel, the determination may be based on the threshold value of the touch pressure, or the determination may be based on the presence or absence of touch for a specified time or longer.

In S501, if the information processing apparatus 104 detects that the user has dragged an object with the input device 107, the information processing apparatus 104 holds the drag start information in the drag start information buffer 650. The information processing apparatus 104 holds and manages the drag start information in a data structure such as the buffer region illustrated in FIG. 6B. The drag start information includes information on the drag-target object on drag start and information on the mouse position. In the S501, the information processing apparatus 104 holds the position information and the size information at the start of dragging of the dragged object (hereafter referred to as the edit-target object) in the buffer regions 653 to 656 of the drag start information. In addition, the information processing apparatus 104 holds a pointer to the dragged edit-target object in the buffer region 657 of the drag start information.

The reason for holding the drag start information in this way is to move or to resize the actual object after the drag process. The drag start information is held in the drag start information buffer 650 until the user finishes the drag process.

The dragged edit-target object refers to an object that has been dragged by the user from the photo list region 206 to arrange the object on the layout editing region 214, as described in the example in FIG. 4. Note that, in the present example, the description focuses on a scene where no objects are arranged on the layout editing region 214, but the processing in FIGS. 5A and 5B is also applied to the case of dragging objects already arranged on the layout editing region 214.

In S501, the information processing apparatus 104 initializes the non-editing page search start index 658 in the drag start information with "1." The non-editing page search start index 658 is a parameter used for scanning the page information index list 705 illustrated in FIGS. 7A, 7B, and 7C.

The information processing apparatus 104 handles page information indicated by the index set in the non-editing page search start index 658 as a current search page for exploring non-editing pages. In S501, the reason for initializing the non-editing page search start index 658 with "1" is described. The page information index list 705 in FIG. 7B is an index list to the structure of each spread page information. The page information index list 705 of FIG. 7B includes a page information structure count 711, and the substantial index list starts with a pointer 712 to the page information structure of the cover spread. Then, a pointer 713 to the page information structure of the spread page corresponding to pages one and two, a pointer 714 to the page information structure of the spread page corresponding to pages three and four, and the final spread page are arranged in order. In the present embodiment, a cover with a different editing region size is excluded from the snapping point search, and searches from the spread page corresponding to pages one and two. For this reason, the non-editing page search start index 658 is initialized with "1" instead of "0" at the top.

In S501, the information processing apparatus 104 holds the mouse position on start of drag as part of the drag start information. That is, the information process apparatus 104 holds the mouse position (X) on a start of drag in the buffer region 651 and the mouse position (Y) in the buffer region 652. X and Y respectively indicate the X-coordinate and the Y-coordinate on the layout editing screen. The mouse position on the start of drag is used in calculating the amount of movement from the start position during dragging and calculating the position to which the dragged edit-target object has moved. Also, the mouse position on the start of drag is used in returning to the original position if the dragging is interrupted by user input.

In the S502, the information processing apparatus 104 performs snapping point generation processing. Note that the processing of S502 is an optional process, and this process may be skipped. The generation of snapping points in S502 shall be skipped in the present embodiment. The processing of S502 shall be described in the second embodiment described later.

In S503, the information processing apparatus 104 obtains the amount of mouse movement. That is, the information processing apparatus 104 calculates the difference between the buffer regions 651 to 652 holding the mouse position at the start of dragging on the drag start information buffer 650 and the current mouse cursor position obtained from the input device 107, and then obtains the mouse movement amount.

Figure 10:
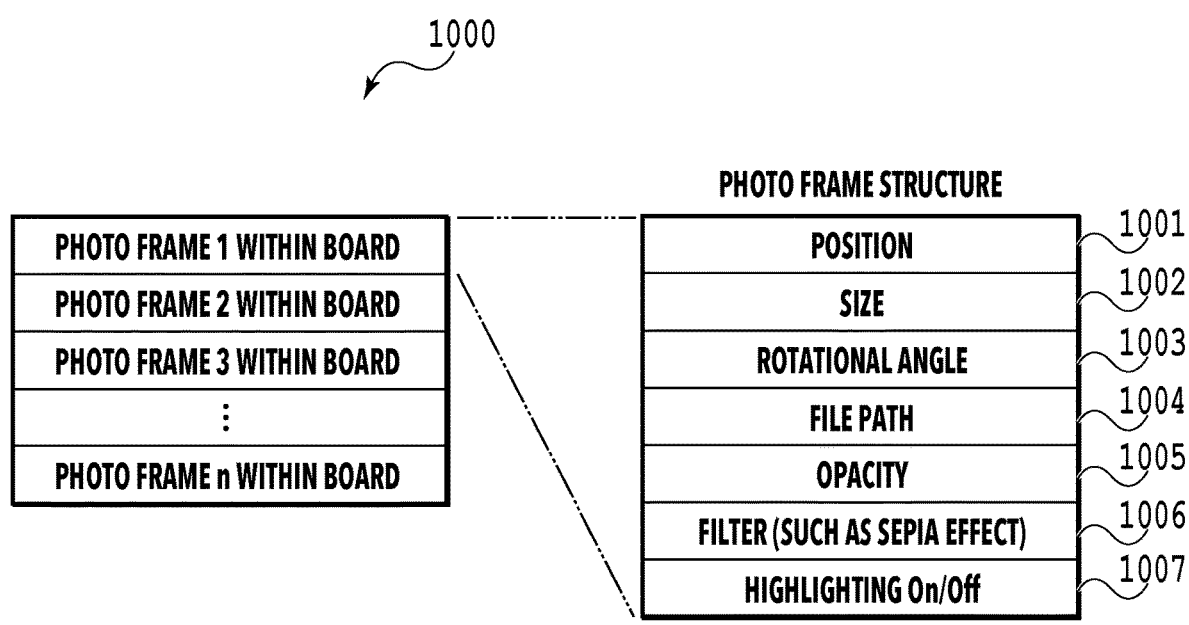
FIG. 10 is an example of a data structure illustrating information on a photo frame.

In S504, the information processing apparatus 104 calculates the destination of the object and moves the object. The information processing apparatus calculates the current position by adding the mouse movement amount obtained in the S503 to the position held in the buffer regions 653 and 654, indicating the object position at the start of dragging in the drag start information buffer 650 illustrated in FIG. 6B. Then, it is set to the position information on the object being edited (the object being dragged) indicated by the pointer 657 to the edit-target object. Specifically, the current position is set to the position 1001 in the photo frame structure illustrated in FIG. 10 holding the information on the object being edited. The photo frame is a frame that includes a photo object. In the present specification, for the sake of simplification of explanation, photo objects and photo frames are treated as substantially the same thing. The photo frame structure in FIG. 10 is an example of a data structure indicating information on each photo frame (photo object). Details of FIG. 10 are described later.

In S505, the information processing apparatus 104 searches for snapping points. In S505, it is determined whether or not there is a snapping point in the page being edited at the current position in S504. If a snapping point is found in the page being edited, the processing proceeds to S506, otherwise the processing proceeds to S507. In the snapping point searching process in S505, the information processing apparatus 104 determines whether or not to perform the snapping operation by comparing the position information on the arranged objects arranged on the spread page being edited and on the object being edited.

Figure 8:
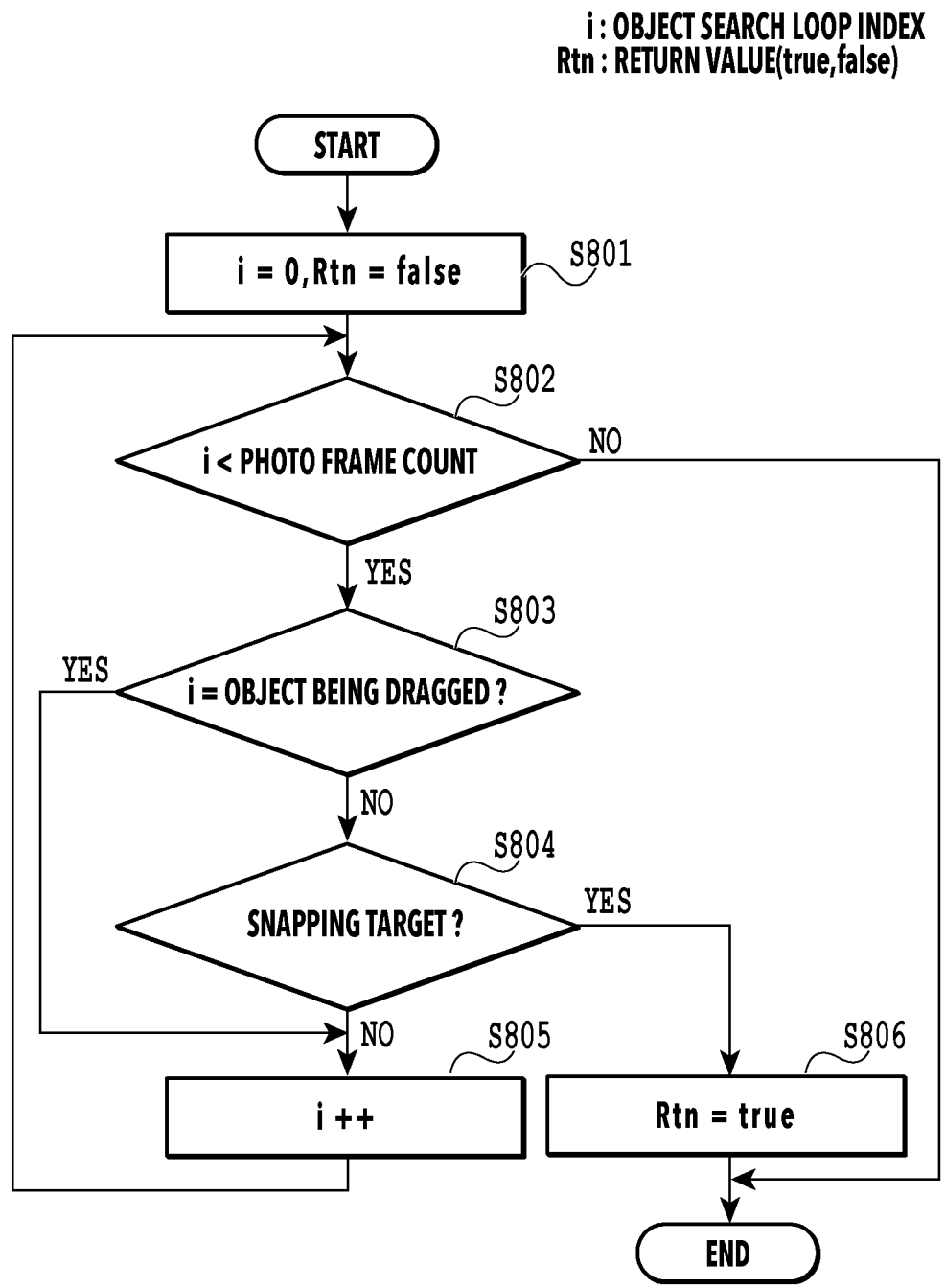
FIG. 8 is a diagram illustrating a detailed example of the snapping point searching process.

FIG. 8 is a diagram illustrating a detailed example of the snapping point searching process in S505. In S801, the information processing apparatus 104 sets "0" to the variable i for the object search loop index secured on the RAM 110 for the search processing on the object snapping point in the page being edited. Also, false is set to the return value variable Rtn. If the return value Rtn has been set to true after the processing in FIG. 8 ends, that indicates that a snap-target reference object has been found, and the processing proceeds to S506 to perform subsequent snapping operations using the position information on the reference object. Meanwhile, if the return value Rtn has been set to false after the processing in FIG. 8 ends, that indicates that a snap-target reference object has not been found, and the processing proceeds to the determination processing of whether or not to utilize the information on a page other than the page being edited in S507.

In S802, the information processing apparatus 104 determines whether or not the search for all photo frames of the page being edited has been completed. Specifically, the information process apparatus 104 compares the loop index i with the previous "page information structure photo frame count 724" indicated by the pointer 714 to the page being edited (in the present case, pages three and four in the spread) in the page information index list 705.

If the index i is less than the photo frame count, the index i indicates a photo frame that has not yet been determined as a snapping target, so that the processing proceeds to S803 to continue the processing. If the index i is equal to or greater than the photo frame count, that means that the determination of all photo frames in the page has been completed and nothing has to be snapped has been found. Therefore, the processing in FIG. 8 ends with Rtn remaining false at the time of initialization, and the processing proceeds to S507.

In S803, the information processing apparatus 104 determines whether or not the object indicated by the index i is the edit-target object itself. The present process refers to the photo frame list 725 of the page information structure 720 of the page being edited. Specifically, the address indicated by the "photo frame list [i] ((i+1)-th from the top of the list)" is compared with the pointer 667 to the edit-target object in the drag start information buffer 650. If the comparison results are the same, the photo frame indicated by the index i is the object itself being dragged, so that it is excluded from snapping determination and the processing proceeds to S805. If the comparison results are different, the processing proceeds to S804 to perform snapping determination.

In S804, the information processing apparatus 104 performs snapping determination to determine whether or not the object indicated by the index i is an object to be snapped, that is, whether or not it is a reference object. Specifically, it compares the edit-target object in terms of position and size information with the photo frames of photo frame list [i] 725 in the page information structure 720 of the page being edited, thereby determining whether or not the object indicated by the index i is the reference object.

Various methods are known for techniques of using an object in the page to determine whether or not it is an object to be snapped. Here, snapping using an object center point is described as an example. The position (x, y) and the size (w, h) of the photo frame are used to obtain the central coordinates (x+w/2, y+h/2) of the photo frame. That is, the central coordinates of the edit-target object and the central coordinates of the object indicated by the index i are obtained. Then, the x-axis (horizontal) distance and the y-axis (vertical) distance of the obtained central coordinates are compared. If the distance is within a predetermined distance (for example, 0.2 mm) for either one of the x-axis and the y-axis elements, it is determined that the object indicated by the index i is the snap-target reference object, and the processing proceeds to S806. In S806, true is set in Rtn and the processing proceeds to S506. This predetermined distance is set to 0.2 mm for convenience of explanation, but it may be any distance in design, and may be varied according to the display magnification on the monitor 106. If both the x-axis and the y-axis are separated from each other by the predetermined distance, the object is not a snapping target, so that the processing proceeds to S805. In S805, the index i is incremented, and the process returns to S802 to compare the next photo frame. In this manner, if a snapping point is found in the page being edited, the processing proceeds to S506, and otherwise the processing proceeds to S507.

Referring back to FIG. 5A, the remaining processing is described. In S506, the information processing apparatus 104 performs snapping processing for moving the edit-target object to the snapping point. In S506, based on the search result in S505, the information process apparatus 104 moves the coordinates of the object being dragged (edit-target object) to the vertical or horizontal coordinate value that is within the determination distance. In the present example, by moving the edit-target object so that the center coordinates are the same, the object is allowed to coincide with the central coordinates of the reference object. Also, in order to make it easier for the user to recognize which photo frame (reference object) has been snapped, a dotted line is displayed at the matched vertical or horizontal coordinate as a snapping guideline. Since the snapping process in S506 has already been generally implemented, the details of the description are omitted. If the processing in S506 is completed, the processing proceeds to S509.

Next, non-editing page utilization snapping processing with reference to other page information is described. The processes of S507 and S508 correspond to the process of referring to other page information to perform snapping.

In S507, the information processing apparatus 104 determines whether or not to utilize data of non-editing pages. If the data of non-editing pages is to be used, the processing proceeds to S508, and otherwise the processing proceeds to S509. In the process of S507, for example, it is determined whether or not the current object count in the layout editing region 214 is less than a predetermined value, or whether or not the process of S508 has already been executed. The determination in S507 is configured to proceed to S508 if the snapping using objects on non-editing pages is beneficial to the user. For example, if the object count in the layout editing region 214 is greater than a predetermined value (for example, one), there is a possibility that snapping will be performed in the page on a change in the mouse position, so that, at this point in time, the process of S508 is temporarily skipped to proceed to S509. Also, if the process of S508 has already been executed, there is no need to repeat the process, so that, at this point in time, the process of S508 is skipped to proceed to S509.

In S508, the information processing apparatus 104 performs object snapping using data of non-editing pages. S508 is non-editing page utilization snapping processing where snapping is performed by referring to already arranged objects on a non-editing page beyond the page being edited.

Figure 9:
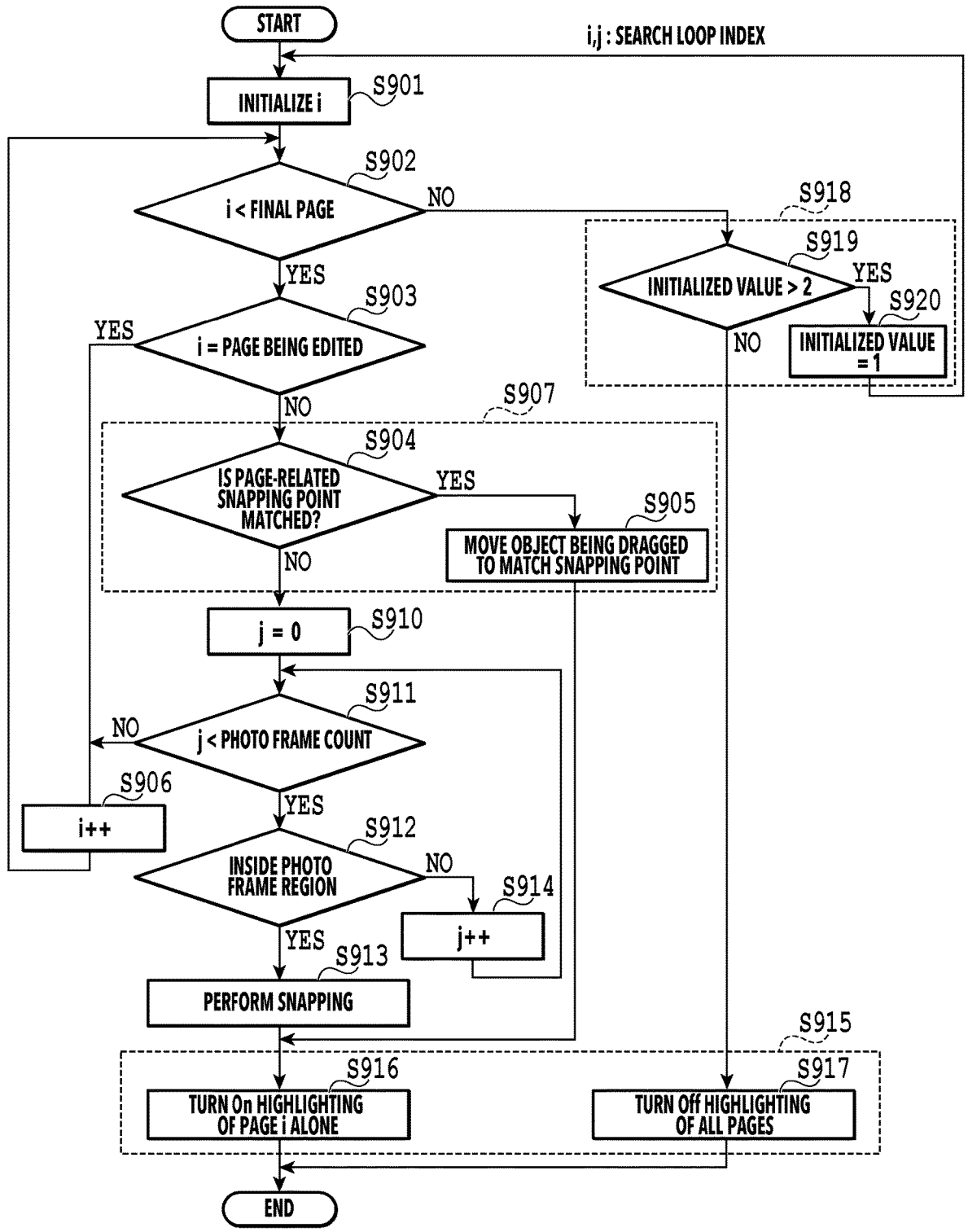
FIG. 9 is a flow chart illustrating the details of the non-editing page utilization snapping processing.

FIG. 9 is a flow chart illustrating the details of the non-editing page utilization snapping processing in S508. In S901, the information processing apparatus 104 initializes a loop index i for page search. The information processing apparatus 104 accesses the page information structure 720 using the page information index list 705 illustrated in FIGS. 7A, 7B, and 7C, and the loop index i for page search. In S901, the loop index i for page search used to access this page information structure 720 is initialized. Here, loop index i is initialized to the value of the non-editing page search start index 658 of the drag start information buffer 650 in order to scan from any page. As described above, in the present embodiment, the value of the non-editing page search start index 658 is initialized to "1" in the process of S501. Therefore, the loop index i is also initialized to "1." The value of the non-editing page search start index 658 is effectively used mainly in the fifth embodiment to be described later, so that a description thereof will be omitted here.

Note that, as described above, the page information index list 705 begins with a pointer 712 to the page information structure of the cover spread. Then, a pointer 713 to the page information structure of the spread page for pages one and two, a pointer 714 to the page information structure of the spread page for pages three and four, and the final page are arranged in order. Here, since the user wishes to search from the spread for pages one and two, the non-editing page search start index 658 is initialized to "1" in S501. Note that the spread page composed of the front and back covers includes the spine and is larger in size than the internal pages, so that the coordinates do not match. Therefore, in the present embodiment, a description is given of an example where the front cover is excluded from the reference target of non-editing page utilization snapping, but one may also refer to a spread page composed of the front and back covers.

Here, the data structures of FIGS. 7A, 7B, and 7C are described. FIGS. 7A, 7B, and 7C are each a diagram illustrating an example of the data structure of the entire photobook created by the layout editing application 112 of the present embodiment. The present embodiment uses hierarchically structured data with the photobook structure 700 as the parent. The data in FIGS. 7A, 7B, and 7C is held by the information processing apparatus 104 by allocating a region on the RAM 110 during editing of the photobook.

The photobook product type 701 holds the product type of the photobook. The title character string 702 is a title character string to be displayed on the cover or the spine of the photobook. The photobook order information 703 is order information after a photobook is ordered. The photobook page count 704 is information on the page count of the photobook.

The page information index list 705 is an index list to page information for accessing the page information structure of each page constituting the photobook. The page information is the information on the spread page. The page information index list 705 has a structure as illustrated by items 711 to 715 in FIG. 7B. The page information structure count 711 is the number of page information structures. For example, in a twenty-page photobook, one page information structure is allocated for each spread page. There is also page information for the front and back covers. Therefore, a list of eleven page information structures is used by a calculation method of "20 (pages)/2+1 (front and back covers)=11". In this case, the page information structure count 711 is set to "11."

The pointer 712 to the page information structure of the front and back covers stores a pointer to the page information structure of the front and back cover spread page. The pointer 713 to the page information structure of pages one and two stores a pointer to the page information structure of the spread page for pages one and two. The pointer 714 to the page information structure of pages three and four stores a pointer to the page information structure of the spread page for pages three and four. As described above, the page information index list stores an access pointer 715 to the page information structure up to the final spread page.

The page information structure 720 illustrated in FIG. 7C is prepared for each spread page. The page information structure 720 stores the arrangement of objects in the spread page, and manages the layout of the objects arranged on the spread page. That is, the page information structure 720 is arrangement information on objects on the spread page. The background type 721 is the background type of the spread page. The snapping information 722 is a region for storing snapping points such as right and left margin regions of the page or binding margin regions. Details of the snapping information 722 are described in the second embodiment. The reference page pointer 723 stores an access pointer to the page information structure of the referenced spread page after performing the snapping utilizing the arrangement of non-editing page objects to be described in the processing of FIG. 9. Then, the access pointer is stored and managed until the access pointer is no longer subject to the snapping utilizing the arrangement of non-editing page objects. The reference page pointer 723 is set to NULL before the snapping utilizing the arrangement of non-editing page objects and if the user moves an object in the reference page. The reference page pointer 723 is described in the sixth embodiment.

The items 724 to 729 in FIGS. 7A, 7B, and 7C store information on the objects arranged on the spread page. The photo frame count 724 is the number of photo frames arranged on the spread page. The photo frame list 725 is a storage location for the photo frame list illustrated in FIG. 10. The character frame count 726 is the number of character frames arranged on this spread page. The character frame list 727 is a storage location for character frame object lists. The stamp frame count 728 is the number of stamp frames such as figures or illustrations. The stamp frame list 729 is a storage location for a stamp frame object list. Since the character object list and the stamp object list are not particularly used in the description of the present embodiment, the description thereof is omitted.

The description returns to the processing in FIG. 9. In S902, the information processing apparatus 104 determines whether or not the search has been completed up to the final spread page. The "final spread page" is the final structure of the "Page Structure" in the page information index list 705. The information processing apparatus 104 compares the loop index i with the page information structure total count 706, and, if the loop index i is lesser, the processing proceeds to S903. Otherwise, the information processing apparatus 104 ends the processing in FIG. 9, in the present embodiment, because the search up to the last page has been completed. Note that the processing at the rectangular portion of S918 described at the position determined as No in S902 is a process to be described in a later-explained fifth embodiment, and the present embodiment does not perform the processing at the rectangular portion of S918. Similarly, the processing at the rectangular portion in S915 is a process to be described in a later-explained fourth embodiment, and the present embodiment does not perform the processing at the rectangular portion in S915.

In S903, the information processing apparatus 104 determines whether or not the page indicated by the loop index i is the page currently being edited. Since the processing in FIG. 9 is snapping using data of other pages, it is performed to exclude the page being edited. Specifically, it is determined whether or not the i-th page information structure pointer in the page information structure pointer list stored in the form of the page information index list 705 in FIGS. 7A, 7B, and 7C matches the start address of the page information structure currently being edited. If they match, the processing proceeds to S906 to go to the next spread page (page structure) and to continue the loop. In S906, i is incremented and the process returns to S902 to continue processing. Meanwhile, if they do not match, if there is an object that can be snapped among the objects of the spread page (page structure) indicated by the loop index i, the processing proceeds to S910 to perform snapping. Note that FIG. 9 illustrates the processing at the rectangular portion of S907 as the processing if there is no match in S903, but the processing of S907 is described in the second embodiment. In the present embodiment, the process of S907 is skipped and the processing proceeds to S910.

In S910, the information processing apparatus 104 initializes the loop index j used for accessing the photo frame structure to "0." The photo frame structure is the photo frame structure illustrated in FIG. 10 and includes items 1001 to 1007. FIG. 10 illustrates an example where a spread page is treated as one board, and the arrangement information on each photo frame (photo object) within the board is represented by a photo frame structure. The processing after S910 is a process for comparing with a photo frame (photo object) in the spread page, which is another page to be processed. Therefore, in S910, the loop index j used to access the photo frame structure is initialized. Note that the photo frame structure specified by the loop index j here is specified by the photo frame list indicated by the page information structure 720 specified by the loop index i. Specifically, the photo frame list indicated by the photo frame list 725 of the page information structure indicated by the pointer to the i-th page information structure of the page information index list 705 in FIGS. 7A, 7B, and 7C is used. After initializing the loop index j, the processing proceeds to S911.

In S911, the information processing apparatus 104 determines whether or not the search for all photo frames of the page currently being searched has been completed. That is, it is determined whether or not the loop index j is less than the photo frame count 724 in the page information structure 720 being searched. If the loop index j is less than the photo frame count 724, the processing using the photo frame indicated by the loop index j has not been completed, so that the processing proceeds to S912. Otherwise, the processing of all photo frames in the page being searched specified by the loop index i is completed, and the next spread page is to be processed, so that the processing proceeds to S906, i is incremented, and the process is repeated again.

In S912, the information processing apparatus 104 determines whether or not the photo frame indicated by the loop index j is the snapping target. That is, it is determined whether or not the photo object already arranged on another page is the snap-target reference object. In the present embodiment, if the current mouse position is included in the rectangular region of the photo frame indicated by the loop index i, the photo frame (photo object) is determined to be the snap-target reference object. Specifically, in S912, the information processing apparatus 104 uses the loop index i to access the page information structure 720 being searched in the page information index list 705 of FIGS. 7A, 7B, and 7C. Then, the photo frame structure indicated by the loop index j is accessed from the photo frame list 725 of the page information structure. Then, a photo frame rectangular region based on the photo frame position 1001 (in this case, upper left coordinates) and the photo frame size 1002 is obtained. Next, the information processing apparatus 104 determines whether or not the current mouse position obtained from the input device 107 is included in the obtained photo frame rectangular region. If the information processing apparatus 104 determines that the current mouse position is outside the photo frame rectangular region, the processing proceeds to S914 to continue the comparison in the photo frame. In S914, the loop index j is incremented, and processing is performed for the next photo frame. Meanwhile, if it is determined that the current mouse position is in the photo frame rectangular region, the processing proceeds to S913.

In S913, the information processing apparatus 104 performs snapping processing using the photo frame (photo object) indicated by the loop index j as the reference object. For example, the information processing apparatus 104 obtains the center point of the photo frame with the loop index j, and moves the center point of the edit-target object being dragged so that the center point coincides with the center point of the photo frame with the loop index j. Specifically, let (Xm, Ym) be the central coordinates of the photo frame rectangular region indicated by the loop index j calculated in S912. Then, the sizes 655 (W) and 656 (H) of the drag start object in the drag start information buffer 650 illustrated in FIG. 6B are used to set the current position (X, Y) of the object being dragged by the following formula.

$$X = Xm - W/2$$

$$Y = Ym - H/2$$

As a result, snapping is executed if the mouse cursor enters the photo frame rectangular region already arranged on the page being referenced while the user is dragging the edit-target object on the spread page being edited. That is, snapping is performed so that the center of the photo frame being referenced and the center of the edit-target object being dragged match. As a result, even if no object is arranged on the spread page being edited, if another page has an object already arranged thereon, snapping can be performed using that arrangement information. Note that S913 is a snapping process, and the position of the edit-target object is undetermined unless the user drops the position. The drop (drag off) process is described following the process in FIG. 5B after exiting the process in FIG. 9.

Also, in the above example, an example has been described where snapping is performed so as to align the central coordinates of the edit-target object with the central coordinates of the reference object, but the present invention is not limited to this. Snapping may be performed so that either the top, bottom, left, or right edge is aligned. Alternatively, snapping may be performed so as to match the rotational angles.

After the processing of S913 ends, in the present embodiment, the processing of the flowchart in FIG. 9 ends, and the processing returns to the processing in FIG. 5B. Note that, after the processing of S913, the processing at the rectangular portion of S915 is shown, and the processing at the rectangular portion of S915 is described in the fourth embodiment. In the present embodiment, the processing of S915 is skipped. After the processing in FIG. 9 ends, the processing proceeds to S509 in FIG. 5B.

In S509, it is determined whether or not dragging has been interrupted. In the present embodiment, in S509, the information processing apparatus 104 determines whether or not the keyboard of the input device 107 has been operated to input the ESC key. If the information processing apparatus 104 detects the pressing of ESC, the processing proceeds to S510, and otherwise the processing proceeds to S511.

In S510, the information processing apparatus 104 performs the process of returning the edit-target object to the drag start position. For example, the information processing apparatus 104 obtains object positions 653 and 654, and object sizes 655 and 656 at the start of dragging from the drag start information buffer 650 in FIG. 6B. Then, the position and the size at the start of dragging are reflected in the edit-target object indicated by the pointer 657 to the edit-target object. As a result, the dragged object is returned to the state before dragging, and the dragging ends. Note that, if the edit-target object is an object in the photo list region 206, the information in the drag start information buffer just needs to be cleared. This is because no object has been arranged in the layout editing region 214 yet. If the edit-target object is an object that has already been arranged in the layout editing region 214, the following needs be reflected. That is, the position and the size at the start of dragging may be reflected in the position 1001 and the size 1002 of the drag-target object indicated by the pointer 657 to the edit-target object. Note that, after the process of S510 ends, the information processing apparatus 104 ends the snapping process illustrated in FIGS. 5A and 5B.

In S511, the information processing apparatus 104 determines whether or not the dragging is turned off. That is, it is determined whether or not the edit-target object has been dropped. The information processing apparatus 104 determines whether or not the dragging has ended based on the information indicating whether or not the user has released the mouse button. If the information processing apparatus 104 determines that the user has released the mouse button, the processing proceeds to S512. Meanwhile, if it is determined that the mouse button 707 has not been released, the process returns to S503 and is repeated. Note that the processing of S514 to S515 indicated by the dotted rectangle of S513, after it is determined that the drag is not turned off, is described in the fifth embodiment. In the present embodiment, the process indicated by the dotted rectangle in S513 is skipped.

In S512, the information processing apparatus 104 finalizes the edit-target object as the current state of the moving object, and ends the dragging. For example, if the snapping guideline is displayed in the processing of S506, the information processing apparatus 104 hides the snapping guideline. The information processing apparatus 104 also refers to the pointer 657 to the edit-target object in the drag start information buffer 650. Then, if that pointer points to the page information structure of the page being edited, it is determined that the object has been moved in the page, and since the move operation has already been completed, the process is completed. Meanwhile, if the pointer 657 to the edit-target object does not point to the page information structure of the page being edited, the edit-target object is an object moved from outside the editing region. Therefore, the process of adding an edit-target object to the page information structure of the page being edited is performed. Specifically, an empty frame is added to the photo frame list of the page being edited (for example, the list illustrated in FIG. 10). Then, the content of the object indicated by the pointer 657 to the edit-target object is copied to the added frame, thereby adding the edit-target object to the photo frame list. For example, an object dragged from the photo list region 206 is added to the photo frame list in this manner.

As described above, according to the present embodiment, it is possible to achieve further functional improvements in editing processing. Specifically, in performing snapping, information on objects already arranged on pages other than the edit target is used for snapping. For example, it is possible to align the position of the edit-target object with the coordinate position the same as that of an object already arranged on a page other than the edit target. As described above, even in a situation where no object is arranged on the page to be edited, the snapping function of the present embodiment can be used to align the edit-target object at a desired position. Therefore, for example, the user can easily and accurately arrange a new photo at the same coordinate position as the existing page. It is also possible to create a photobook with a sense of unity.

Second Embodiment

In the present embodiment as well, as in the first embodiment, an example is described where snapping is performed on a page to be edited using information on an object that has already been arranged on a page other than the edit target. In the present embodiment, processing for snapping, according to the top, bottom, left, and right margins estimated from the object arrangement on the existing page and the margins from the binding portion, is described. The design can be improved by a unified layout of the margins on each spread page.

The basic configuration and processing flow of the present embodiment are the same as those of the first embodiment, and the differences are mainly described below. The present embodiment performs processing utilizing the snapping information 722 of the page information structure 720 of FIGS. 7A, 7B, and 7C.

Figure 11:
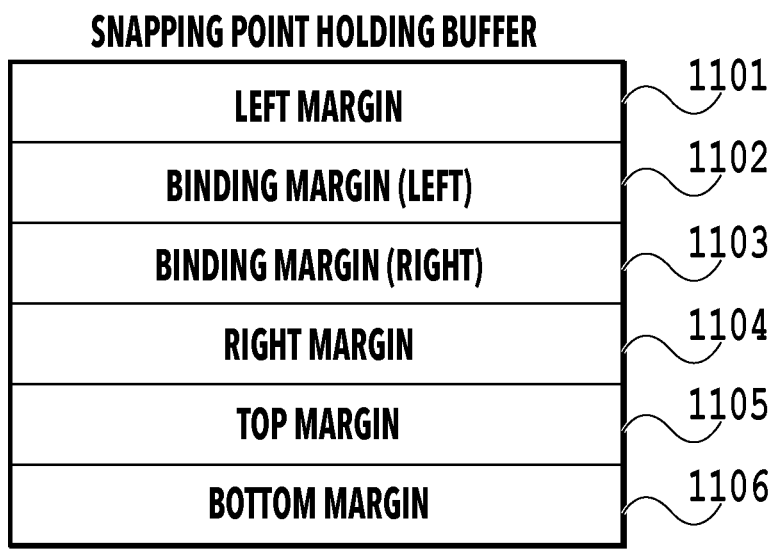
FIG. 11 is a diagram illustrating an example of a snapping point holding buffer.

FIG. 11 is a diagram illustrating an example of a snapping point holding buffer. It is assumed that the snapping information 722 of the page information structure 720 stores data in the same format as the snapping point holding buffer in FIG. 11. The snapping point holding buffer in FIG. 11 stores left margin, right margin, top margin, bottom margin, and binding margin (right and left) information. That is, in the present embodiment, the page information structure (that is, the information for each spread page) stores information on the snapping points of the margins of the spread page. The present embodiment performs processing using this snapping information 722.

In the present embodiment, the snapping point generation processing of S502 is added to the flowchart in FIG. 5A. Also, a step for snapping related to page design is added to the snapping processing of the page being edited in S505 and S506. In addition, the processing of S907 is added to the processing in FIG. 9 corresponding to the snapping processing using the data of a non-editing page in S508. A detailed description is given below.

In S502, the information processing apparatus 104 performs snapping point generation processing. The information processing apparatus 104 of the present embodiment generates and holds snapping point data for each spread page in the form of a snapping point holding buffer as shown in FIG. 11.

Figure 12:
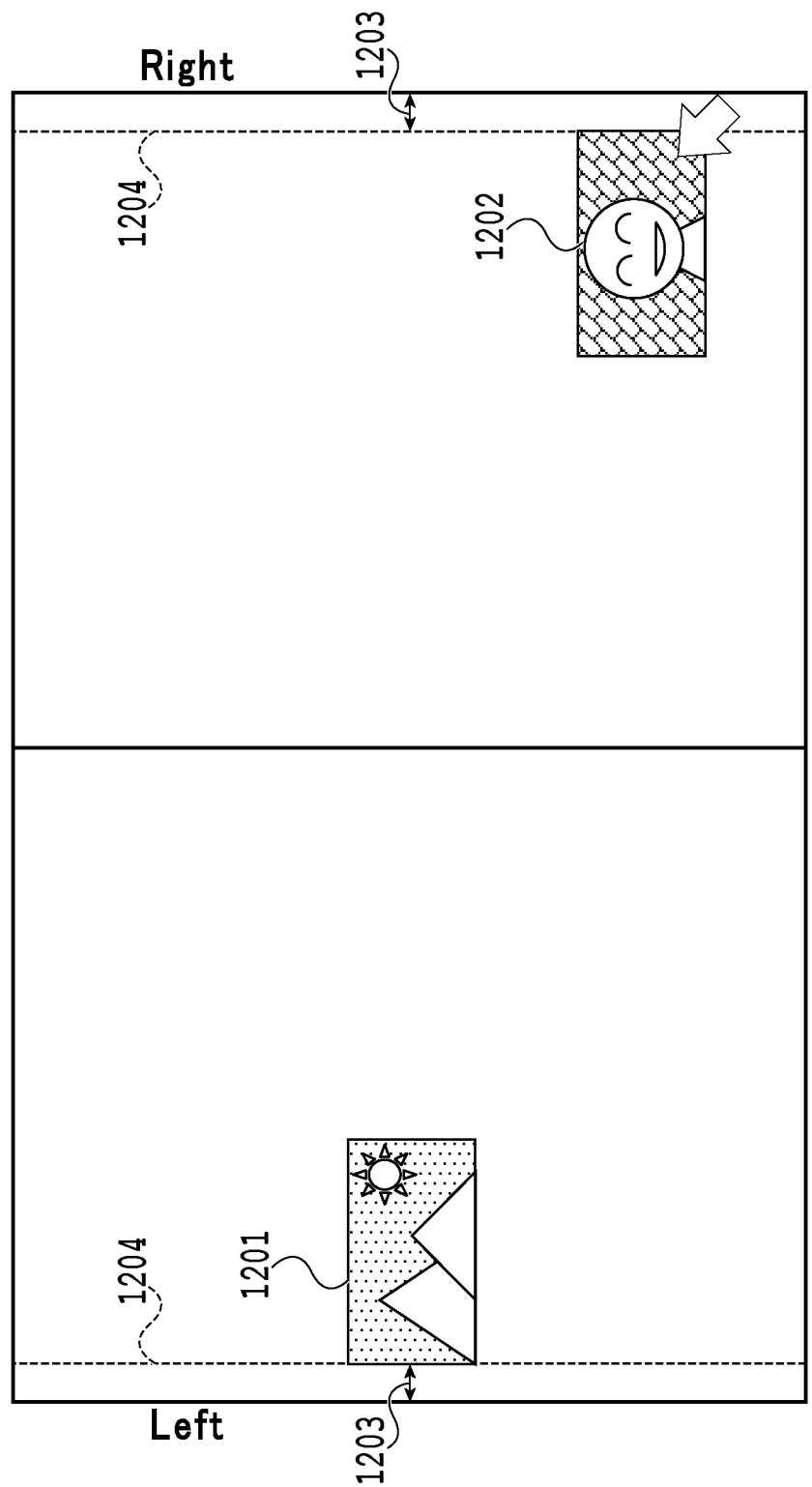
FIG. 12 is a diagram illustrating an example of a layout.

FIG. 12 is a diagram illustrating an example of a layout. An example of the snapping point data illustrated in FIG. 11 is described with reference to FIGS. 11 and 12. In the present embodiment, all the objects that make up the page being edited are scanned to create the data of the snapping point holding buffer illustrated in FIG. 11. Note that the snapping points illustrated in FIG. 11 are data indicating respective coordinate positions in the layout editing application 112. An overview is described by taking "snapping points related to page margins" as an example of one of the snapping point holding buffer in FIG. 11.

FIG. 12 is a layout example of the body of a photobook (page spread excluding the cover and the front and rear flyleaves). In FIG. 12, the snapping points of the page margins (right and left) are obtained and illustrated from the relationship between the page and the arranged photo objects. Page margin snapping means snapping at a position within the margin distance from the edge of the sheet. That is, the snapping point is the position within the margin distance from the edge of the sheet.

There are top and bottom margins and right and left margins as the margins from the edges of the sheet. The right and left margins indicate the shortest distances from the right and left edges of the sheet to the photo objects arranged within. The shortest distance is the distance 1203 between the edge of the sheet and the left edge of the photo object 1201 closest to the right or left edge of the sheet, among the photos forming the spread page in FIG. 12. The positions separated from the right and left edges of the sheet by this shortest distance are the coordinate position data of the right margin 1104 and the left margin 1101 in FIG. 11, respectively. Here, in editing the right page of the spread page illustrated in FIG. 12, by arranging the photos uniformly at the distance 1203 between the left edge and the sheet edge, it is possible to create a photobook having a layout with aligned margins from the right and left page edges. FIG. 12 shows a state where the photo object 1202 is being dragged, and illustrates how the photo object 1202 is snapped to a position away from the right margin by the distance 1203 automatically calculated as described above.

Figure 13:
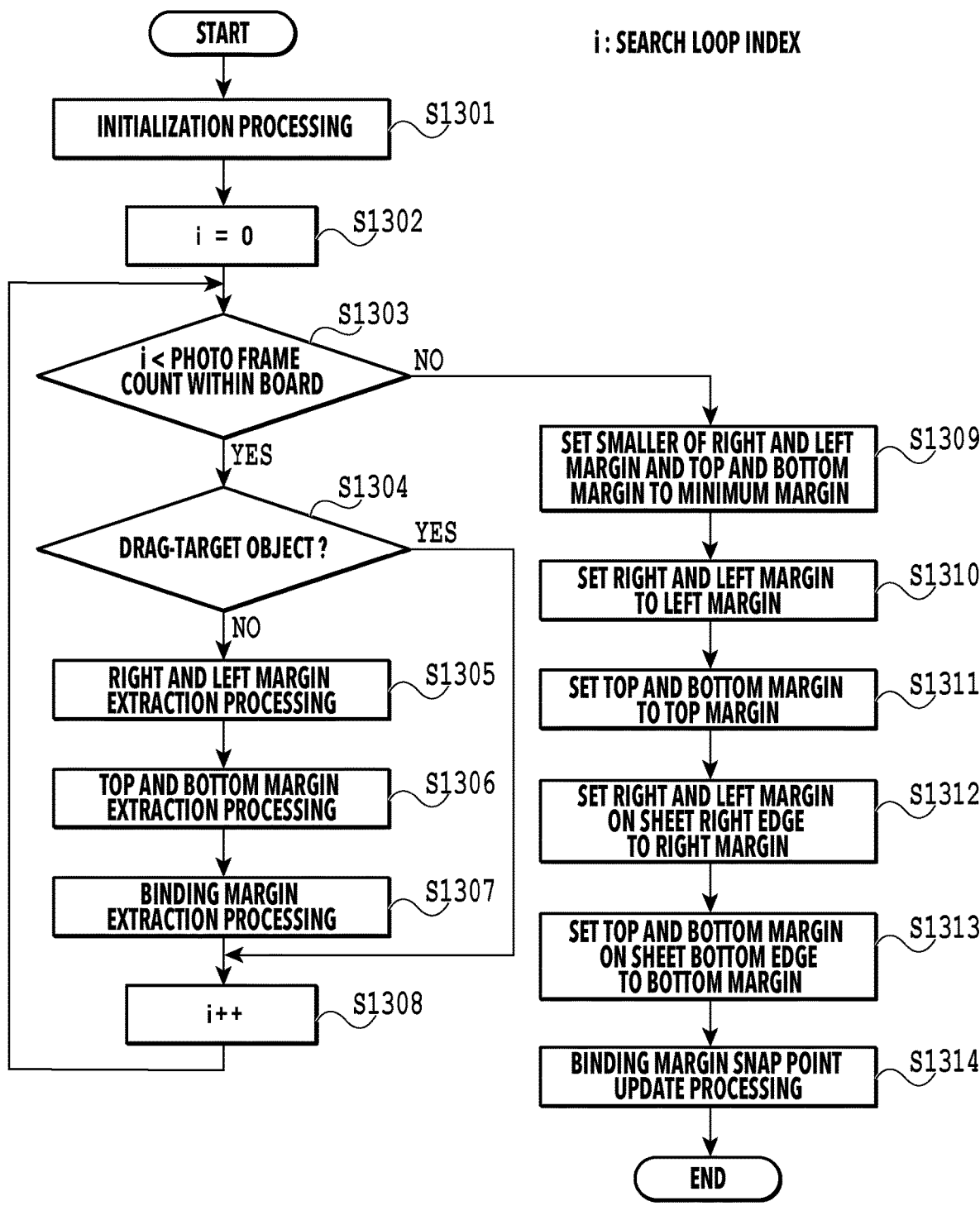
FIG. 13 is a flowchart illustrating the details of the snapping point generation processing.

FIG. 13 is a flowchart illustrating the details of the snapping point generation processing in S502. Note that the snapping point generation processing in S502 in the flowchart in FIG. 5A is a process of generating snapping points on the spread page being edited. As for the generation processing of snapping points for other spread pages, they are generated by the editing processing for spread pages.

The processing in FIG. 13 can be roughly described as processing that repeats a loop where each margin value is rewritten to an optimum value one after another from the initial state using the positions of individual objects. In S1301, the information processing apparatus 104 allocates a region for the interval holding buffer 600 illustrated in FIG. 6A on the RAM 110 and initializes values. Specifically, the information processing apparatus 104 holds the value of sheet width/4 in the right and left margins 501 and the binding margin 504 as an initial value. In addition, the information processing apparatus 104 also holds the value of sheet height/2 in the top and bottom margins 502 as an initial value.

In S1302, the information processing apparatus 104 sets the value of the loop index i for photo frame search to zero. The information processing apparatus 104 performs initialization by setting the value of the loop index i to zero in order to perform the processing described later on all the photo frame objects arranged on the spread page currently being edited.

In S1303, the information processing apparatus 104 determines whether or not the processing for all photo frames in the spread page currently being edited has been completed. That is, the information processing apparatus 104 determines whether or not the loop index i is less than the photo frame object count in the page, and, if it is determined to be less, the processing proceeds to S1304. Meanwhile, if the information processing apparatus 104 determines that the loop index i is greater than or equal to the photo frame object count in the page, the processing proceeds to S1309.

The information processing apparatus 104 scans the objects in the page in steps S1303 to S1308, and repeats these processes to perform processing of scanning all objects. In S1304, the information processing apparatus 104 determines whether or not the object to be processed indicated by the loop index i is the edit-target object (that is, the currently dragged object). If it is determined that the object to be processed is the object to be dragged, the processing from S1305 to S1307 is skipped in order to exclude it from the margin value extraction target, and the processing proceeds to S1308. Otherwise, the processing proceeds to S1305.

In S1305, the information processing apparatus 104 performs right and left margin extraction processing. The right and left margin extraction processing is a process for extracting the distance of objects close to the right and left edges of the page. That is, by repeating the loop, the distance of the object closest to the right and left edges of the page is extracted from all the objects. After that, it is reflected in the right and left margin data 601 of the interval holding buffer 600. In S1306, the information processing apparatus 104 performs top and bottom margin extraction processing. The top and bottom margin extraction processing is similar to the above-described right and left margin extraction processing, and is performed on the top and bottom margin data 602. In S1307, the information processing apparatus 104 performs binding margin extraction processing. The binding margin extraction processing is similar to the above-described right and left margin extraction processing, and is a process for binding at the center of the page, and processing is performed for the binding margin data 604. Note that the details of the processing from S1305 to S1307 are also described in the '705 document, which is incorporated herein by reference. In S1308, the information processing apparatus 104 increments the value of the loop index i, and returns to the processing of S1303.

If the processing of S1304 to S1307 for all objects in the page being edited is completed, the processing proceeds to S1309. In S1309, the information processing apparatus 104 compares the right and left margin data 601 and the top and bottom margin data 602 in the interval holding buffer 600 in FIG. 6A, and sets the lesser of the values to the minimum margin data 603 as the minimum margin. By the above-described processing, the margin values necessary to generate snapping points are calculated and stored in the interval holding buffer 600 illustrated in FIG. 6A. The information processing apparatus 104 uses the values in the interval holding buffer 600 to perform the processing of S1310 to S1313 described below, and thereby sets the values (coordinates) of the snapping points in the snapping point holding buffer illustrated in FIG. 11. A specific description is given below.

In S1310, the information processing apparatus 104 sets the right and left margin data 601 of the interval holding buffer 600 in FIG. 6A to the left margin 1101 of the snapping point holding buffer of FIG. 11. In S1311, the information processing apparatus 104 sets the top and bottom margin data 602 of the interval holding buffer 600 to the top margin 1105. In S1312, the information processing apparatus 104 sets a value obtained by subtracting the right and left margin data 601 of the interval holding buffer from the X-coordinate value of the right edge of the sheet to the right margin 1104. In S1313, the information processing apparatus 104 sets a value obtained by subtracting the top and bottom margin data 602 of the interval holding buffer 600 from the Y-coordinate value of the bottom edge of the sheet to the bottom margin 1106. In S1314, the information processing apparatus performs binding margin snap point update processing. For example, if an object is arranged in the center of a spread page, the values are updated so that snapping at the binding margin is not performed. Otherwise, the binding margin data 604 is used to set appropriate values to the binding margin (left) 1102 and the binding margin (right). Details of the processing from S1309 to S1313 are also described in the '705 document, which is incorporated herein by reference.

Figure 14A:
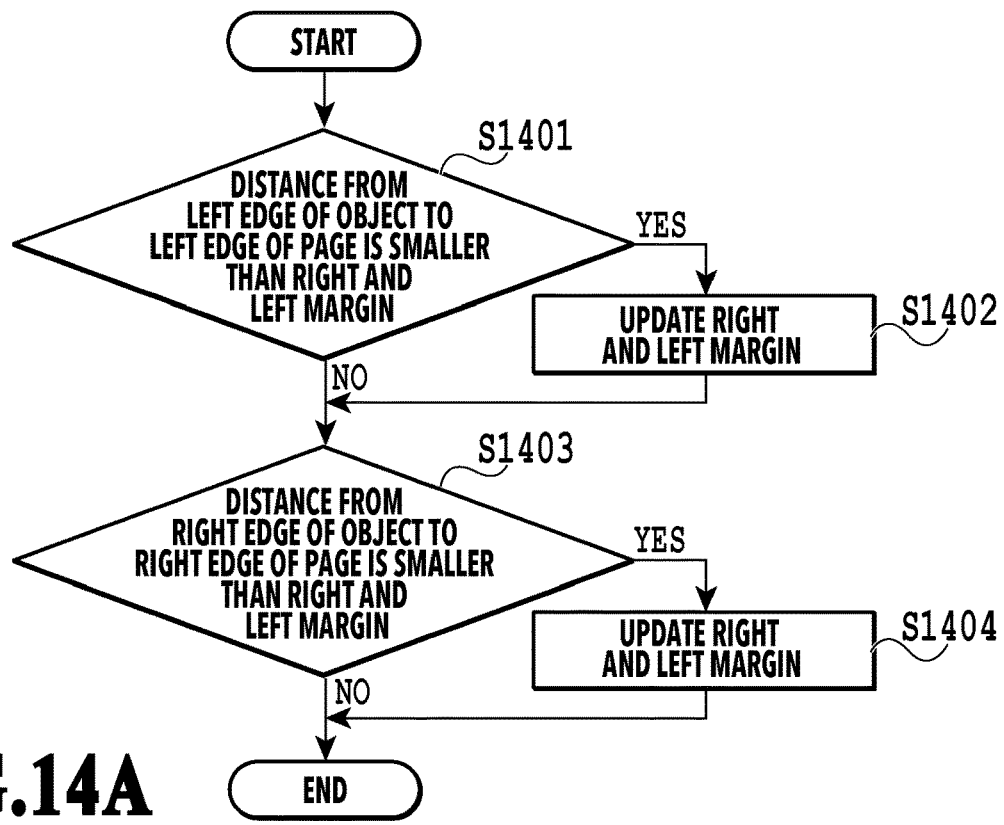
FIGS. 14A and 14B each are a flowchart of margin extraction processing.
Figure 14B:
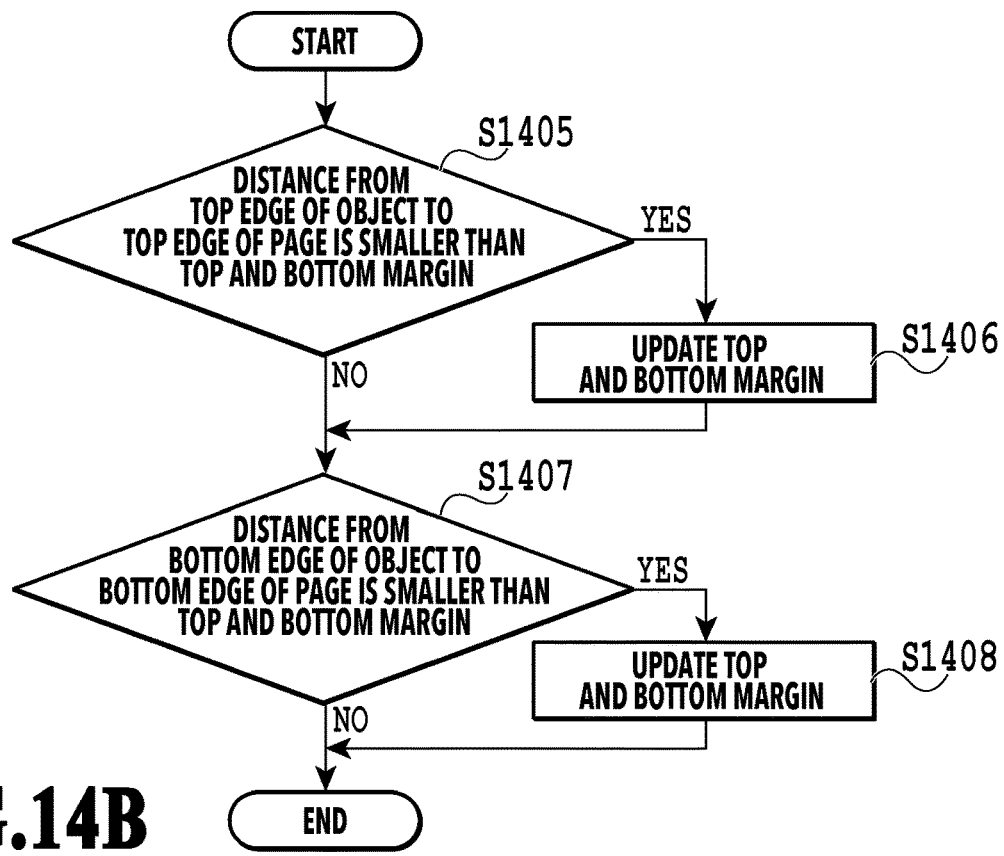

FIGS. 14A and 14B each are a flowchart of right and left margin extraction processing or top and bottom margin extraction processing. FIG. 14A corresponds to the right and left margin extraction processing in S1305, and FIG. 14B corresponds to the top and bottom margin extraction processing in S1306.

A brief description is given using the example in FIG. 14A. In S1401, the information processing apparatus 104 determines whether or not the distance from the left edge of the current object to the left edge of the sheet is less than the right and left margin data 601. If the distance from the left edge of the current object to the left edge of the sheet is less than the right and left margin data 601, the processing proceeds to S1402, and otherwise the processing proceeds to S1403. In S1402, the information processing apparatus 104 overwrites the right and left margin data 601 with the distance from the left edge of the current object to the left edge of the sheet. Then, the processing proceeds to S1403.

In S1403, the information processing apparatus 104 determines whether or not the distance from the right edge of the object to the right edge of the sheet is less than the right and left margin data 601. If it is determined that the distance from the right edge of the object to the right edge of the sheet is less than the right and left margin data 601, the processing proceeds to S1404, and otherwise the processing in FIG. 14A ends. In S1404, the information processing apparatus 104 overwrites the right and left margin data 601 with the distance from the right edge of the current object to the right edge of the sheet. Then, the processing in FIG. 14A ends.

The processing in FIG. 14B is also the same as the processing in FIG. 14A. In S1405, the information processing apparatus 104 determines whether or not the distance from the top edge of the current object to the top edge of the sheet is less than the top and bottom margin data 602. If the distance from the top edge of the current object to the top edge of the sheet is less than the top and bottom margin data 602, the processing proceeds to S1406, and otherwise the processing proceeds to S1407. In S1406, the information processing apparatus 104 overwrites the top and bottom margin data 602 with the distance from the top edge of the current object to the top edge of the sheet. Then, the processing proceeds to S1407.

In S1407, the information processing apparatus 104 determines whether or not the distance from the bottom edge of the object to the bottom edge of the sheet is less than the top and bottom margin data 602. If it is determined that the distance from the bottom edge of the object to the bottom edge of the sheet is less than the top and bottom margin data 602, the processing proceeds to S1408, and otherwise the processing in FIG. 14B ends. In S1408, the information processing apparatus 104 overwrites the top and bottom margin data 602 with the distance from the bottom edge of the current object to the bottom edge of the sheet. Then, the processing in FIG. 14B ends.

The above description is the description of the snapping point generation processing in S502. Note that the flowchart in FIGS. 5A and 5B is a process that is started if an object is dragged on a spread page being edited. Other than dragging, objects may be arranged, rearranged, or resized on a spread page being edited. Therefore, on completion of editing for each spread page, the value of the snapping point holding buffer in FIG. 11 is updated with the determined content.

Figure 15:
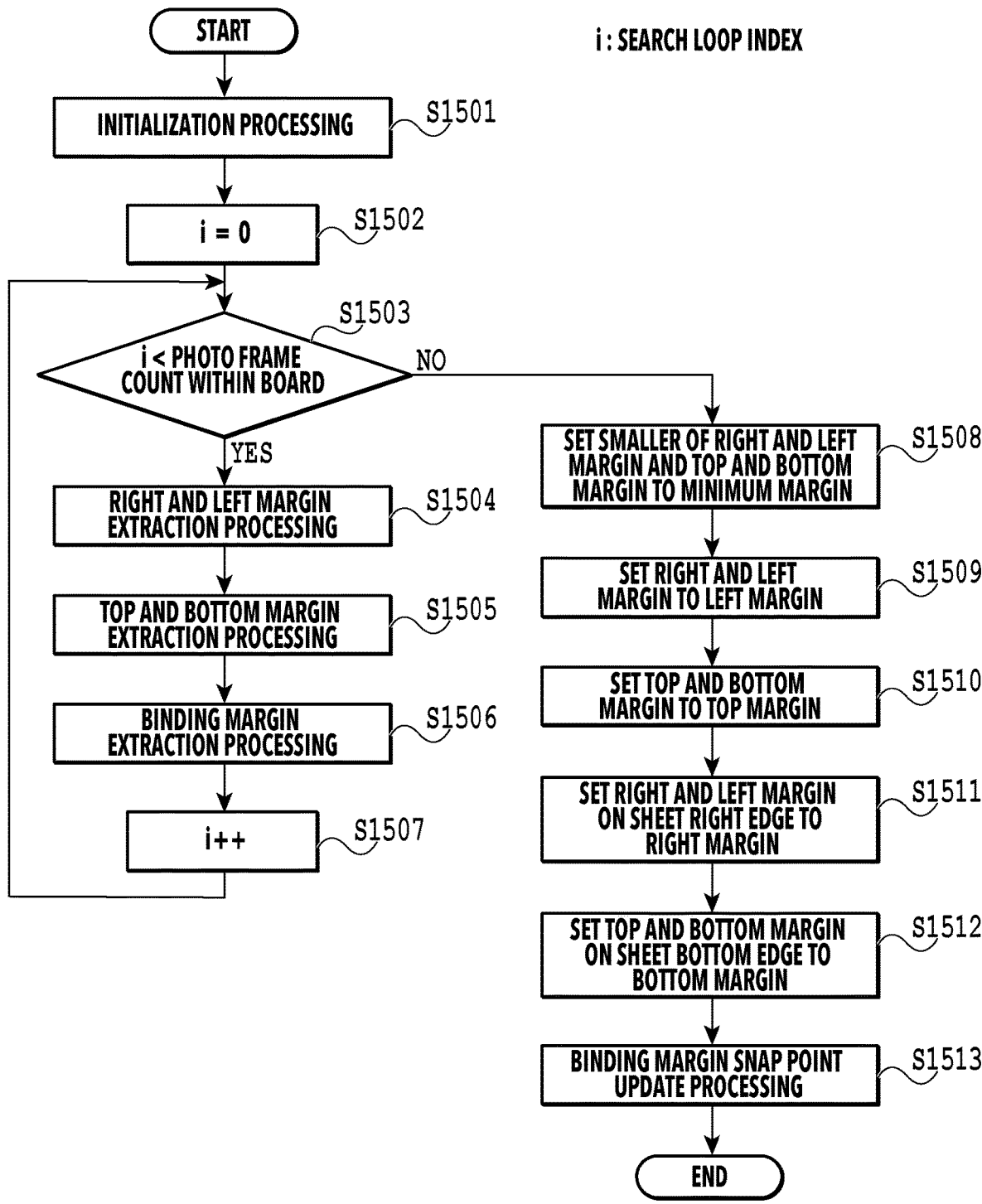
FIG. 15 is a flowchart illustrating snapping point generation processing.

FIG. 15 is a flowchart illustrating snapping point generation processing performed on completion of editing for each page. The flowchart in FIG. 15 is a process obtained from the flowchart in FIG. 13 by deleting the determination of whether or not the object is the drag-target object in S1304. That is, the processing of S1501 to S1503 and S1301 to S1303 is the same. Further, the processing of S1504 to S1513 is the same as the processing of S1305 to S1312, respectively. As described above, in a page being edited, snapping points are generated by the processing in FIG. 13, and, in an edited page, snapping points have already been generated by the processing in FIG. 15.

The contents of the snapping point holding buffer illustrated in FIG. 11 thus obtained are stored in the snapping information 722 in the page information structure 720 illustrated in FIGS. 7A, 7B, and 7C. The present embodiment performs processing using this snapping information 722 as well. A specific description is given below.

The snapping point search processing of S505 in the present embodiment is described. In present embodiment, in the processing of S505, in addition to the processing described in the first embodiment, the following processing is also performed as a search for snapping points related to page design. In S505, the information processing apparatus 104 compares the snapping point generated in S502 (FIG. 11) with the current position of the edit-target object calculated in S504, and determines whether or not there is a corresponding snapping point. The method of obtaining the current position of the object is as described in the first embodiment. That is, one may refer to the object data indicated by the pointer 657 of the edit-target object. Taking as an example a case when the object is a photo frame, the object data has a data format such as the photo frame structure illustrated in FIG. 10.

In S505, the information processing apparatus 104 compares the X-coordinate of the object position 1001 with the left margin 1101 of the snapping point holding buffer, and determines whether or not they are closer than a given prescribed distance. If close, the processing proceeds to S506. Meanwhile, if not close, it is compared with the binding margin (left) 1102. Similarly, the X-coordinate of the object position 1001 is sequentially compared with the X-coordinate of the right edge of the object obtained by "the X-coordinate of the object position 1001+the width of the size 1002," the binding margin (right) 1103 of the snapping point holding buffer, and the right margin 1104. If the information processing apparatus 104 determines that the distance is closer than the given prescribed distance, the processing proceeds to S506.

In S505, the information processing apparatus 104 sequentially compares the Y-coordinate of the object position 1001 with the top margin 1105 and the bottom margin 1106 of the snapping point holding buffer. Then, if the information processing apparatus 104 determines that the distance is closer than the given prescribed distance, the processing proceeds to S506. In addition, in S505, the information processing apparatus 104 compares the bottom edge of the object obtained by "Y-coordinate of the object position 1001+height of the size 1002" with the bottom margin 1106. If the information processing apparatus determines that the distance is closer than the prescribed distance, the processing proceeds to S506.

Meanwhile, in S505, if the information processing apparatus 104 determines that none of the snapping points (1101 to 1106) in the snapping point holding buffer is closer than the specified distance, the processing proceeds to S507. That is, since no snapping target is found among the snapping points calculated from the object in the spread page being edited, the processing proceeds to S507 to perform snapping based on the object arrangement of another page.

First, the processing of S506 in a case when a snapping point is found in the snapping point search of S505 is described below. That is, processing using an object that has already been arranged in a page will be described.

In S506, the information processing apparatus 104 moves the object to the snapping point. The information processing apparatus 104 aligns the position of the object indicated by the pointer 657 to the edit-target object with the snapping point. Specifically, the following is obtained for each snapping position determined to match. If it matches the left margin 1101 or the binding margin (left) 1102, it is reflected in the X-coordinate of the object and moved so that the left edge of the object being dragged is aligned with the matched snapping point. If it matches the binding margin (right) 1103 or the right margin 1104, the "matched snapping point-width of the size 1002" is reflected in the X-coordinate of the object, and the right edge of the object being dragged is moved so as to align with the matched snapping point. If it matches the top margin 1105, it is reflected in the Y-coordinate of the object, and the top edge of the object being dragged is moved so as to align with the matched snapping point. If it matches the bottom margin 1106, the value obtained by subtracting the object height is reflected in the Y-coordinate of the object, and the bottom edge of the object being dragged is moved so as to align with the matched snapping point. Further, the information processing apparatus 104 displays a snapping guideline for allowing the user to recognize the target snapped on the display device according to the reflected snapping point.

As described above, FIG. 12 illustrates an example of the snapping guideline display. FIG. 12 illustrates an example of a snapping guideline displayed after snapping to the left margin or right margin. In FIG. 12, the photo object 1201 is arranged at the position closest to the right/left edge. FIG. 12 illustrates an example of snapping by dragging the photo object 1202 so that the right edge thereof approaches the position of the right/left margin. Also, in FIG. 12, arrow icons indicating the distance 1203 and dotted lines 1204 are displayed on the screen. This allows the user to recognize that the photo object 1202 being dragged has been snapped to the right/left margin. Note that, in FIG. 12, the user is presented with a dotted snapping line and an arrow on the right and left sides each. It should be noted that the lines and arrows for presentation are examples, and any form may be used as long as the user can recognize it.

Next, the non-editing page utilization snapping processing of S508 is described. In the present embodiment, as described above, the processing of S907 is added to the processing in FIG. 9. The processing of S907 includes the processing of S904 and S905.

In S904, the information processing apparatus 104 determines whether or not the page-related snapping point is matched. Specifically, the information processing apparatus 104 refers to the snapping information 722 of the page information structure 720 indicated by the i-th loop index pointer from the page information index list 705 of FIGS. 7A, 7B, and 7C. Then, by comparing the snapping information 722 with the position information of the currently moving object calculated in S504, it is determined whether or not the moving object is positioned at the snapping point. As described above, the snapping information 722 stores the snapping point data at the time of completion of editing the spread page in the form of the snapping information holding buffer illustrated in FIG. 11.

Here, for example, in a photobook, the size of each spread page is the same except for the front and back covers, and the editing coordinate regions thereof match. Also, the coordinate positions of the binding portions are the same. Therefore, by referring to snapping data of various margins held in the snapping information 722 of pages other than the page being edited, it is possible to reproduce the margin snapping at the same coordinates as the spread page. That is, the processing is the same as the snapping point region determination processing in S505 described above, except that the snapping information 722 refers to another spread page. If the information processing apparatus 104 finds matching information in the snapping information 722 by region determination in S904, the processing proceeds to S905, and otherwise the processing proceeds to S910. The processing after S910 is as described in the first embodiment.

In S905, the information processing apparatus 104 moves the edit-target object being dragged to match the snapping point that has been found. The information processing apparatus 104 performs snapping by aligning the position of the edit-target object indicated by the pointer 657 to the edit-target object with the snapping point. The processing of S905 is the same as the processing described in S506, so that the description is omitted.

As described above, according to the processing of the present embodiment, even if no object is arranged on the spread page being edited, snapping can be performed by referring to data of another spread page on which objects have already been arranged. As a result, it is possible to unify the amount of margin, such as right and left margins and binding margins, with that of existing pages, thereby realizing a layout with a sense of unity.

Third Embodiment

Generally, the snapping of objects in a page being edited is performed to align objects by arranging them at equal intervals or by aligning the top edge thereof with other objects. Here, as described in the first embodiment, in a case of snapping with an object that has already been arranged on another page, the user often wishes to utilize the layout of another page that has already been edited. Therefore, in the present embodiment, not only the position of the edit-target object, but also, various attributes, such as size and opacity filter are matched with the snapping target. Various attributes include rotational angle and various image effect filters such as sepia.

As a result, in a case of a photobook, desired photos can be arranged in the same location as in the created page and in the same layout (such as position, size, and filter). This makes it easy to create a photobook where group photos have the same position, size, and filter on each classroom page, such as yearbooks. In addition, as for the determination of a snapping area, determining to the extent of roughness whether or not it is within the rectangular region of an object arranged on a non-editing page is more preferable than micro determination, such as whether or not the distance from the snapping line on the X-axis or the Y-axis is within a range of several dots.

The configuration and processing of the present embodiment are basically the same as those described in the first embodiment. The following description focuses on the differences. In the present embodiment, the processing of S913 in FIG. 9, which is the detailed processing of non-editing page utilization snapping in S508, is different.

In S913, the information processing apparatus 104 obtains layout information of the photo frame object, which is the snapping target reference object of the non-editing page found in S912. That is, the attributes of position 1001, size 1002, rotational angle 1003, and opacity 1005 in FIG. 10 are obtained. Then, these information sets are copied to the attributes of the edit-target object. As a result, the photo data indicated by the file path 1004 of the edit-target object remains the original data, and the edit-target object is snapped in the same location and layout as the reference object of the non-editing page found as the snapping target. Also, by dropping the edit-target in that state, the edit-target object is arranged as an object having the same attributes as the reference object of the non-editing page.

As described above, in the present embodiment, it is possible to perform snapping with attributes such as position, size, rotational angle, and filter matched with arranged objects on a non-editing page. Note that the present embodiment may be combined with the processing described in the second embodiment.

Fourth Embodiment

In the present embodiment, an embodiment is described that allows the user to recognize the spread page referenced during the snapping processing. In the above-described embodiments, as the number of edited pages increases, the user may not know to which page the snapping corresponds. Therefore, in the present embodiment, processing is performed to notify the user of the spread page that is the snapping reference source and to allow the user to recognize this. Specifically, a guide display of the spread page that is the snapping reference source is performed.

Figure 16:
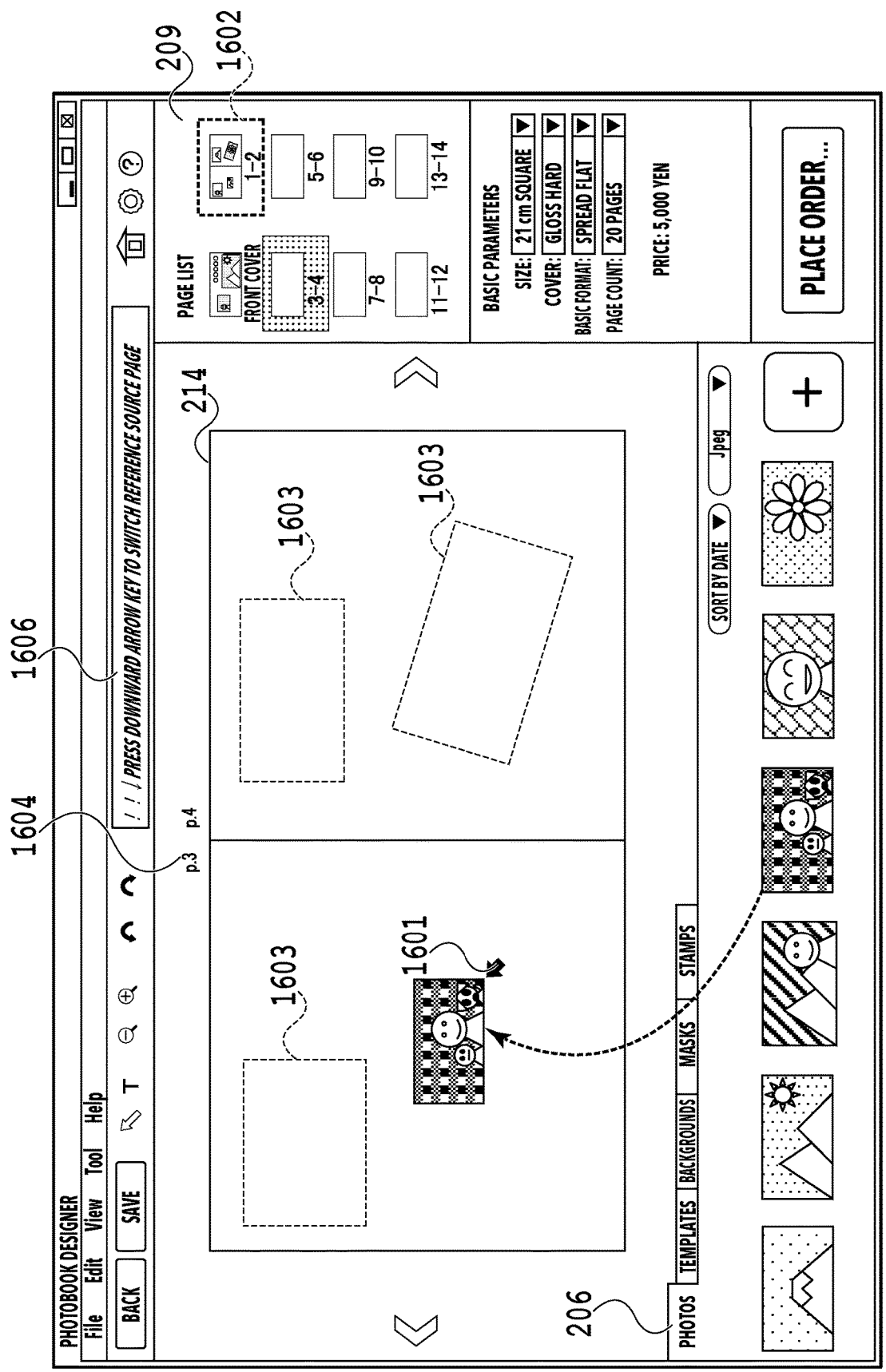
FIG. 16 is a diagram illustrating an example of guide display of snap target pages.

FIG. 16 is a diagram illustrating an example of a guide display of snap target pages. As described in the first embodiment, in the page list region 209, the page currently being edited in the layout editing region 214 is highlighted with a gray rectangle. The user can see this highlighting and recognize the spread page that is currently being edited. In FIG. 16, the spread page for pages three and four is the current spread page being edited. The user is operating and dragging the mouse cursor 1601 to add the photo object selected in the photo list region 206 to this spread page. Then, as described in the first embodiment, and the like, it illustrates a state where snapping has been performed using information on other pages. Note that, in the example in FIG. 16, it is assumed that snapping has been performed using objects that have already been arranged on the spread page for pages one and two.

In the present embodiment, as illustrated in FIG. 16, the thumbnail portion of the spread page for pages one and two in the page list region 209 is displayed in a dotted line rectangle for highlighting 1602. As a result, the user can easily check which spread page is being used for snapping while editing the spread pages. The basic configuration and processing of the present embodiment are the same as those of the example described in the first embodiment, and the differences thereof are mainly described below. Other portions of FIG. 16 are described with reference to subsequent embodiments.

In the present embodiment, the processing of the rectangular portion of S915 is added to the non-editing page utilization snapping processing in FIG. 9. The processing of S915 includes the processing of S916 and S917. After the processing of S905 or S913 is completed, the process proceeds to S916. That is, if snapping is performed using a spread page other than the spread page being edited, the processing proceeds to S916.

In S916, the information processing apparatus 104 turns on the rectangle highlighting flag of the thumbnail of the page indicated by the value of the loop index i, and turns off the rectangle highlighting flag of the thumbnails of other pages. The information processing apparatus 104 in the present embodiment copies the value of i to the highlighted page index 659 in the drag start information buffer 650 stored in the RAM 110 in the form in FIG. 6B so that it can be determined that the highlighting processing is underway. The information processing apparatus 104 refers to the highlighted page index 659 and highlights the thumbnail image of the page in the page list region 209 of the layout variation screen.

S917 is a process if snapping is not performed as a result of searching all pages, and is, specifically, a process if it is determined as No in S902. In S917, the information processing apparatus 104 turns off the rectangular highlighting flags of the thumbnails of all pages. That is, the highlighted page index 659 is cleared. In the information processing apparatus 104, if effective information is not included in the highlighted page index 659, no highlighted display is performed in the page list region 209 of the layout variation screen.

As described above, in the present embodiment, if snapping is performed using information on a non-editing page, display control is performed to highlight the spread page that is the reference source thereof. This allows the user to easily check which spread page is being referenced for snapping.

Note that the processing may be combined with the processing described in the second embodiment or the third embodiment.

Fifth Embodiment

In the processing in the embodiments described so far, as the number of edited pages increases, the number of pages that can serve as snapping reference sources also increases. As a result, the snapping point of a page that is not the page to be matched may be matched first, and the snapping point of the desired page may not be matched. This is because, if the above-described processing is performed and there is a portion where the coordinates of the snapping area overlap, the previous page matches first. Here, in general, the page to be snapped is often located near the page being edited. For this reason, it is conceivable to operate the search index of the non-editing page utilization snapping illustrated in FIGS. 5A and 5B so as to search, in reverse, order from the page immediately before the page being edited toward the first page. However, in reality, it may happen that one wishes to refer to a page in a distant location.

In view of the above, in the present embodiment, an example of performing snapping using a page desired by the user as a reference source is described. First, an embodiment of implementation of the UI (user interface) is described with reference to FIG. 16. If a snapping target of non-editing page utilization snapping is found, the reference source page is subjected to highlighting 1602 as described in the fourth embodiment. Further, a predetermined message is displayed on a message board 1606 with an appearance of an electronic bulletin board. In the example in FIG. 16, a message is displayed that reads, "Press Downward Arrow Key to Switch Reference Source Page." If the page with highlighting 1602 is not the desired page, the user presses the downward arrow key to perform non-editing page utilization snapping. Then, by turning off the drag after the snapping on the object of the desired page is obtained, the object arrangement is performed where the object snapping desired by the user has been performed. Although the "downward arrow key" is used as an example here, the "Shift key" or the "Ctrl key" may be used as long as they correspond to a predetermined operation.

In the present embodiment, in addition to the example described in the fourth embodiment, the processing of the dotted line rectangle in S513 of FIG. 5B is added, and the processing of the dotted line rectangle in S918 of FIG. 9 is further added. The processing of the dotted line rectangle in S513 includes S514 and S515. The processing of the dotted line rectangle of S918 includes S919 and S920.

First, the processing added in FIG. 5B is described. S514 and S515 indicated by S513 are added as processing if it is determined in S511 that the drag is not turned off. In S514, the information processing apparatus 104 determines whether or not the user has pressed a predetermined key (the "downward arrow" key in the present example) while the object is being dragged. If the predetermined key has been pressed, the processing proceeds to S515, and otherwise the processing proceeds to S503.

In S515, the information processing apparatus 104 performs search page increment processing. Specifically, the information processing apparatus 104 substitutes a value obtained by adding one to the search loop index i in FIG. 9 to the non-editing page search start index 658. As a result, if the processing of the non-editing page utilization snapping in S508 is entered subsequently, the value of the non-editing page search start index 658 is reflected by the initialization processing of S901. That is, the search is started from the page following the snapping reference source page.

It should be noted that, if this process is repeated, the final page is gradually approached, and a matching target may not be found until the end. Therefore, the processing of S918 is added to the processing in FIG. 9. That is, in the processing of non-editing page utilization snapping, if the reference object is not found even after searching up to the last page, in other words, at the location where the final page determination in S902 is matched and the processing gets out, the processing of S918 is added.

S918 in FIG. 9 is a process for returning to the first page after searching up to the last page. In S919, the information processing apparatus 104 determines whether or not the initial value used to initialize the loop index i is greater than two. The information processing apparatus 104 holds and manages values used for initialization in the non-editing page search start index 658 of the drag start information buffer stored on the RAM 110. The information processing apparatus 104 checks the value of the non-editing page search start index 658 and determines whether or not the value is greater than two. If it is determined that the value is greater than two, the processing proceeds to S920, and, otherwise, the processing proceeds to the processing of S917 or terminates the processing in FIG. 9.

In S920, the information processing apparatus sets the value of the non-editing page search start index 658 to one. Then, the processing returns to S901. As a result, the information processing apparatus 104 returns to the search state from the first page and then proceeds to S901, then returns to the first page and continues the search for objects that utilize non-editing pages.

As described above, according to the present embodiment, if there are multiple pages detected as snapping reference sources, the user can perform a predetermined operation to appropriately switch reference source pages. Therefore, it is possible to easily implement object snapping with any page as a reference source.

Sixth Embodiment

In the present embodiment, an example is described where, if non-editing page utilization snapping is performed, the reference source page to be snapped is fixed. In a case of performing non-editing page utilization snapping, the user often wishes to match the layout with the reference source page. In other words, in a case when non-editing page utilization snapping is performed, anything but snapping to the objects in the reference source page used for that snaping or in the page currently being edited may be an obstacle to the operation. In view of the above, in the present embodiment, an example is described where, if non-editing page utilization snapping is performed, the reference source page is fixed and held. In the following, the points different from the first embodiment are mainly described.

In the present embodiment, the page information structure 720 in FIGS. 7A, 7B, and 7C stored in the RAM 110 of the information processing apparatus 104 is provided with a holding location for the reference page pointer 723. NULL is set to the initial value of the reference page pointer 723 if the information processing apparatus 104 allocates a region. In the reference page pointer 723, the pointer to the page referenced in a case of using the result of the non-editing page utilization snapping for the first time in the editing operation of the spread page corresponding to this page information structure 720 is set. After the reference page pointer is set, processing is performed based on this setting value. A specific description is given below.

First, processing of setting the reference page pointer 723 after performing non-editing page utilization snapping is performed is described. In FIG. 5B, in S512, the information processing apparatus 104 sets the reference page pointer 723 as follows in deciding the current position of the moving object after the drag is off. First, the information processing apparatus 104 checks the value of the reference page pointer 723. Then, it is determined whether or not a value of one or more is set, that is, whether or not the first non-editing page utilization snapping is performed in the currently edited page. If the value of the reference page pointer 723 has been set to a value of one or more, it means that non-editing page utilization snapping has already been performed, so that the reference source page is maintained. That is, in this case, the reference page pointer 723 is not changed.

Meanwhile, if the reference page pointer 723 is NULL, the pointer to the reference source page after performing non-editing page utilization snapping is copied to the reference page pointer 723. Specifically, the data obtained by offsetting the highlighted page index 659 from the top pointer 712 in the page information index list 705 illustrated in FIGS. 7A, 7B, and 7C is copied to the reference page pointer 723. The reason why the reference page pointer is not the index, but the pointer value of the page information structure is that the layout editing application frequently changes the page order. By managing with pointers, even if the page index list is rewritten due to page replacement, or the like, it is possible to reliably reach the page information referenced at the time of the first snapping.

Figure 17:
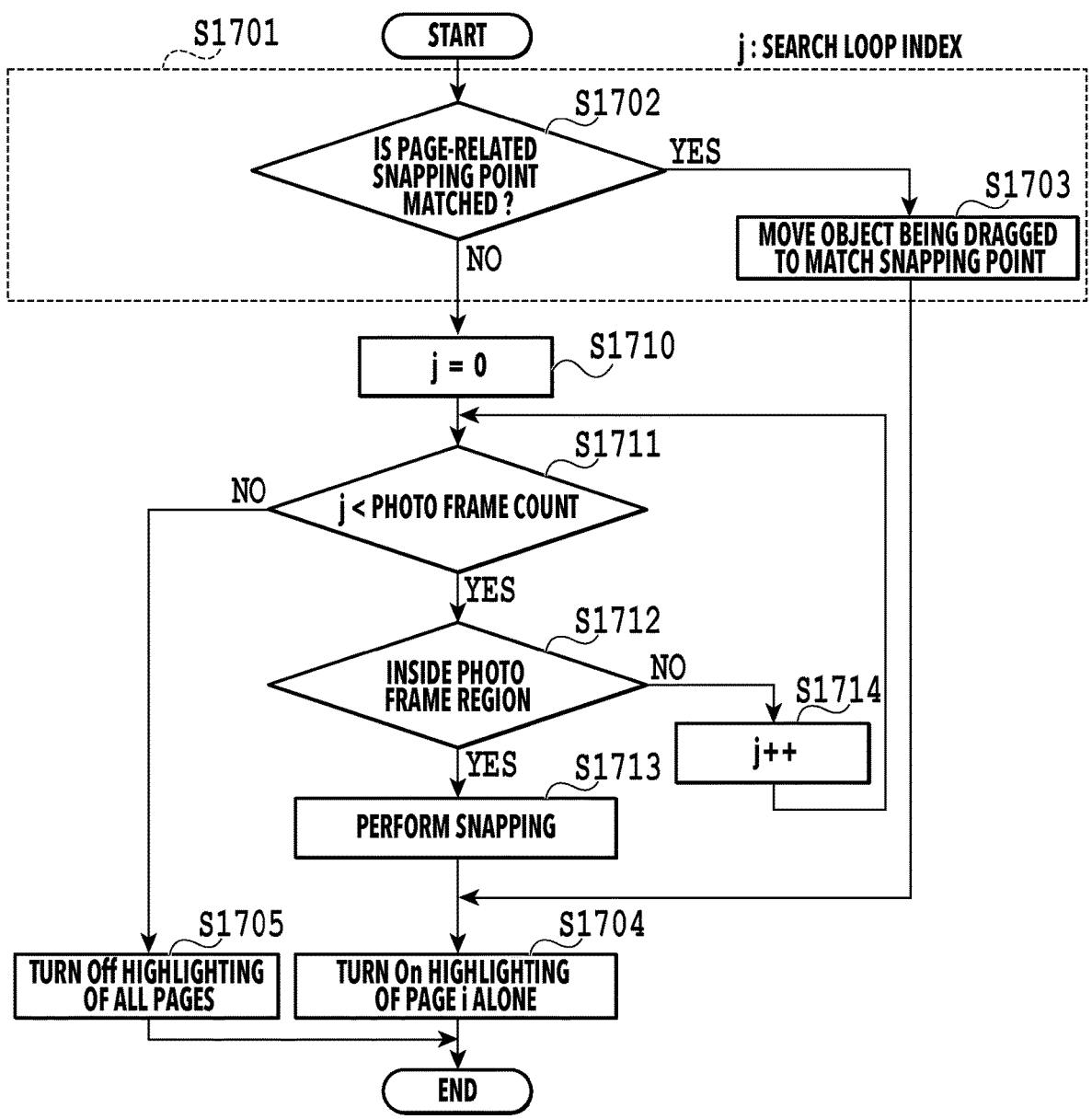
FIG. 17 is a flowchart illustrating the processing of non-editing page utilization snapping.

Further, in the non-editing page utilization snapping processing of S508, the reference page pointer 723 is checked, and if a value of one or more is set, the page search loop is not performed, and only the page indicated by the reference page pointer 723 is processed. Specifically, the reference page pointer 723 is checked, and if a value of one or more is set, the processing illustrated in FIG. 17 is performed as the processing of non-editing page utilization snapping of S508. Meanwhile, if a value of one or more is not set in the reference page pointer 723, the processing described with reference to FIG. 9 is performed.

FIG. 17 is a flowchart illustrating the processing of non-editing page utilization snapping for processing only the page indicated by the reference page pointer 723. The processing in FIG. 17 is a diagram obtained by removing the logic for scanning all pages from the processing in FIG. 9.

The processing in the rectangular portion of S1701 is the same as that of S907. Here, the information processing apparatus 104 performs processing using the snapping information 722 of the page information structure of the spread page indicated by the reference page pointer 723. The details of the processing are the same as the example described in S907. If the page-related snapping point is matched in S1702 and the snapping ends in S1703, the processing proceeds to S1704. In S1704, page highlighting processing is performed. This processing is the same processing as S915.

The subsequent processing from S1710 to S1714 is the same as the processing from S910 to S914. As the photo frame list referenced here, the photo frame list of the page structure referenced by the reference page pointer 723 is used. In S1511, if it is determined that all photo frames have been searched, that is, if the loop index j is greater than or equal to the number of photo frames, the processing proceeds to S1705. In S1705, highlighting is turned off. S1705 is the same processing as S917.

As described above, in the present embodiment, if the spread page as a reference source has been decided, processing is performed by fixing the decided spread page as a reference source in performing non-editing page utilization snapping. This makes it possible to improve user convenience. In addition, as described in the present embodiment, by guide display of the spread page as the reference source of snapping processing, the user can easily check to which spread page the snapping is fixed.

Seventh Embodiment

The present embodiment describes an example of further improving convenience in performing non-editing page utilization snapping. The user may wish to arrange objects exactly like the layout of an existing page on which the objects have already been arranged. In this case, in the above-described embodiments, it is necessary to drag the edit-target object into the region where objects are arranged on the spread page that is the reference source. However, in performing non-editing page utilization snapping, as a typical example, nothing is arranged on the spread page being edited (layout editing region 214). For this reason, the user moves the object while imagining a page out of sight, and the user may not be able to properly grasp the movement destination. In the present embodiment, an example is described of visualizing, in the layout editing region 214, a region where a non-editing page object to be snapped is arranged.

The form of the UI of the present embodiment is described with reference to FIG. 16. In FIG. 16, the page list region 209 highlights 1602 a thumbnail of the snapping target page. In FIG. 16, a photo object is dragged to arrange the object at the position indicated by the mouse cursor 1601 and then has been snapped to one of the objects of the spread page for pages one and two by non-editing page utilization snapping. In the present embodiment, in addition to highlighting 1602 of the thumbnail of the snapping target page, the outer shapes 1603 of all photo frame objects on the reference source page are displayed in dotted line rectangles. This makes it easier for the user to recognize the page layout.

Furthermore, as described in the sixth embodiment, once the reference page is decided by snapping, guide display is performed immediately after detection of a drag movement for adding a photo from the photo list region 206. That is, before snapping detection, guide display of highlighting 1602 and outer shapes 1603 of all photo frame objects on the reference source are performed. As a result, it suffices that the user drags the additional content by targeting a desired rectangle in the guide display rectangle of the outer shape 1603 of the photo frame object on the reference source page, thereby improving the work efficiency of the user. Processing added to the sixth embodiment is described below.

First, page guide start processing is described. The page guide start processing is a process for starting the photo frame highlighting processing on the reference source page and the page thumbnail highlighting processing. This processing is executed immediately after holding the drag start information in S501 illustrated in FIG. 5A. In the present example, the condition for starting highlighting is if the reference page pointer 723 of the page information structure for the page being edited is not NULL, and if dragging for adding an object. Dragging for adding an object means dragging from the photo list region 206.

In the photo frame highlighting processing on the reference page, the information processing apparatus 104 refers to the page information structure indicated by the reference page pointer 723. Then, a rectangle obtained from the position 1001 and the size 1002 in all the photo frames in the photo frame list 725 of the page information structure is displayed on the edit screen with dotted lines like the outer shape 1603 in FIG. 16. Also, as described in the fourth embodiment, the information processing apparatus 104 performs highlighting processing for thumbnails of reference pages.

The end processing for the page guide displayed in this manner is described. It suffices that the end processing for the page guide is performed by the information processing apparatus 104 ending the highlighting displayed as the photo frame highlighting processing of the reference page immediately before the end of the processing of the flowchart in FIGS. 5A and 5B. Note that turning off the highlighting 1602 in the page list region 209 is the same as the example described in the fourth embodiment.

As described above, according to the present embodiment, in the layout editing region 214, the region of the object as a candidate for snapping in non-editing page utilization snapping is visualized and displayed. Therefore, the user can easily specify the position to which to move the object.

Eighth Embodiment

In the embodiments so far, snapping during layout editing has been described as an example. In the present embodiment, another example of easily realizing the same layout as the reference source as described in the seventh embodiment is described. Specifically, the layout information (page information) of the reference source page, excluding the substantial portion of the image data of all the photo frames, is copied to the layout information of the page being edited. In other words, an empty photo frame is arranged on the page being edited. Also, a guide is displayed in the empty photo frame on the page being edited. Generally, if a photo object is dragged and dropped from the photo list region 206, or the like, onto a photo frame with image data arranged, the photo in the photo frame is replaced with the dragged and dropped photo. In general, the user is accustomed to such operations for arranging content, so that user convenience can be further improved.

Figure 18:
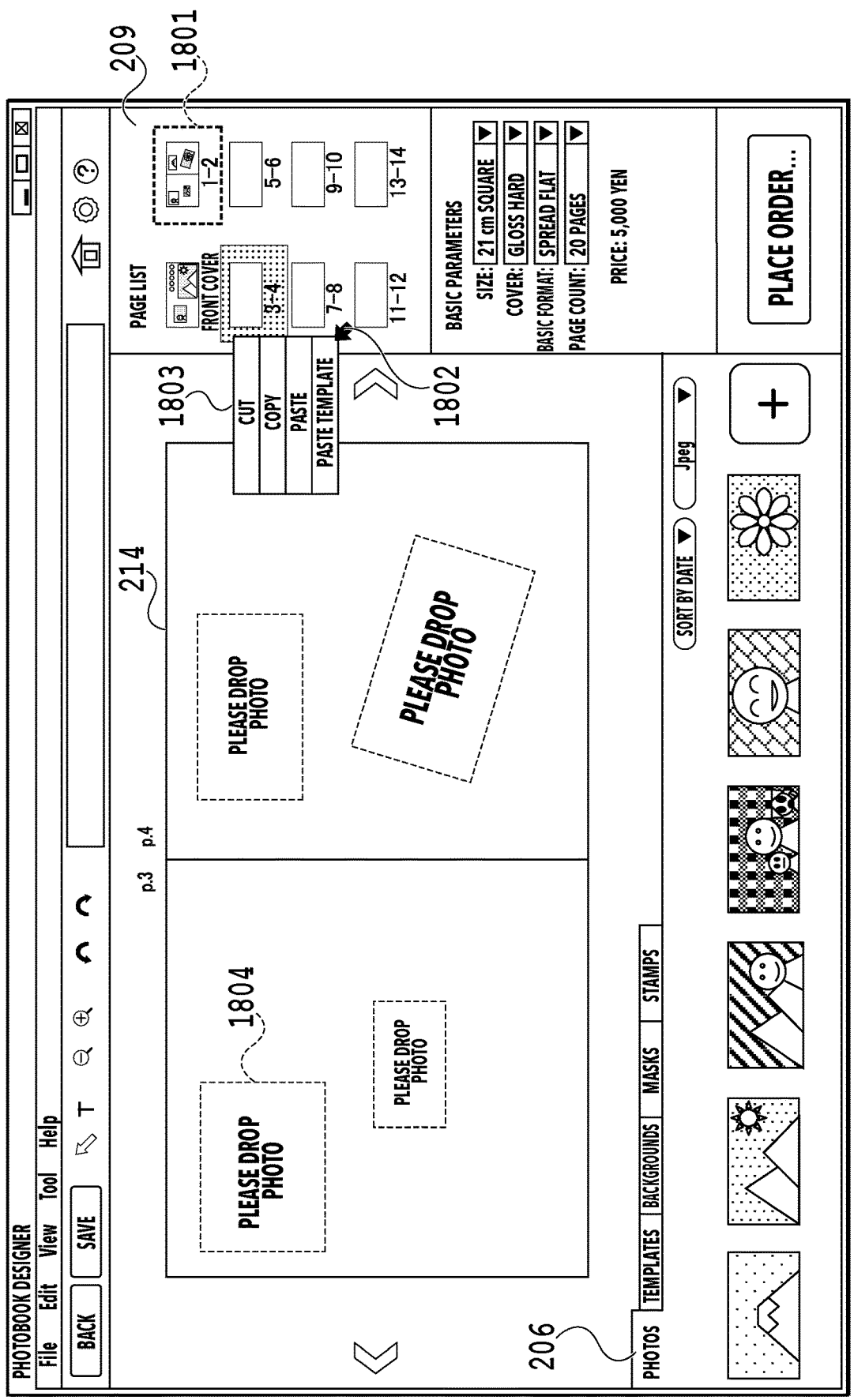
FIG. 18 is a diagram illustrating an example of a user interface (UI).

FIG. 18 is a diagram illustrating an example of UI in the present embodiment. FIG. 18 is a diagram where the user has completed editing up to the spread page for pages one and two, and has newly started editing the spread page for pages three and four. Assume that the user wishes to arrange photo objects on the spread page for pages three and four in the same arrangement as the spread page for pages one and two. On the page thumbnail list screen in the page list region 209, the user right-clicks on the thumbnail of the spread page for pages one and two. Then, for example, right-click menus such as cut and copy are displayed. Here, the user selects copy. After that, in a general example, on the thumbnail of the spread page for pages three and four in the page list region 209, "Paste" is selected from the right-click menu. After that, the same photo object as the spread page for pages one and two is copied to the spread page for pages three and four, and a page with the same design is created. The user then drags and drops the desired photo object from the photo list region 206 to replace with the desired photo. In this way, it is common practice to design pages with the same layout but different photos.

In the above-mentioned commonly used method, if the number of photos laid out is great, mistakes such as failing to replace some of the photos are likely to occur. In the present embodiment, as indicated in the right-click menu 1803, an operation item "Paste Template" is added. Then, if "Paste Template" is selected, only the photo frame is pasted, excluding the substantial information of the photo object at the time of pasting. That is, an empty photo frame is pasted. This empty photo frame is not print-displayed, but its outer shape is displayed as a dotted line rectangle, like the outer shape 1804, only at the time of edit screen. Also, a message to the effect that "Please Drop Photo" is displayed inside, for example, in gray. If the user drags and drops a photo object into this empty photo frame, only the substantial information portion of the photo object is replaced. As a result, it is possible to easily perform the same layout arrangement with the desired non-editing page. In addition, since the photo frame is just an empty photo frame, if no photo object is arranged, the convenience is improved in that no photo is not printed.

A specific configuration is described. The photo frame list 725 in the page information structure 720 of FIGS. 7A, 7B, and 7C corresponds to all photo frames in the spread page. Therefore, this photo frame list 725 is copied to the photo frame list of the page information structure of the designated spread page. At that time, the file path 1004 of the photo frame structure is cleared to NULL. As a result, no reference is made to the substantial information of the photo object such as jpeg, and the photo frame is copied as an empty photo frame. The information processing apparatus 104 displays a dotted line rectangle on the photo frame being edited, such as the outer shape 1804 in FIG. 18, if the file path 1004 of the photo frame structure is NULL and in edit mode. It should be noted that the method of obtaining the position and the size of the rectangle before displaying the dotted line rectangle may be the same processing as in the rectangular display of the photo frame described in the seventh embodiment. In the present embodiment, in displaying a dotted line rectangle such as the outer shape 1804, as illustrated in FIG. 18, user convenience is further improved by displaying a message such as "Please Drop Photo."

As described above, according to the present embodiment, among the layout information of the other spread pages, it is possible to copy the information, excluding the substantial information of the photo object, to a desired page. That is, it is possible to copy a page on which an empty photo frame has already been arranged. At this time, by explicitly displaying the position and the size of the empty photo frame on the editing screen, the user can easily grasp the position where they wish to arrange the object.

Other Embodiments

In each of the above-described embodiments, the photobook order placement system was used as an example, but the system is not limited to that example. It can be applied to general layout editing applications that provide multiple pages to be edited. For example, the processing of each embodiment described above may be applied to presentation document creation software, CAD software, and the like.

Further, in each of the above-described embodiments, an example has been described where the edit-target object and the snap-target reference object are photo objects (photo frames), but the present invention is not limited to this. The edit-target object and the snapping target may be character frames or stamp frames. Further, they are not limited to objects of the same type, but may be objects of different types. For example, the edit-target object may be a photo object, and the snap-target reference object may be a stamp object. Also, it may be configured such that the user can set which object is to be snapped.

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing method comprising:
   obtaining arrangement information on an object already arranged on a second page, which is a page different from a first page being edited, wherein, in the obtaining, if there is a first object that is already arranged on the first page, the obtaining obtains arrangement information on the first object; and
   snapping an edit-target object on the first page based on the obtained arrangement information on the object, wherein, in the snapping, if snapping is possible based on the information on the first object, the edit-target object is snapped, based on the arrangement information on the first object, without using the arrangement information on a second object, which is the object already arranged on the second page.

2. The information processing method according to claim 1, wherein, in the snapping, if snapping is impossible based on the information on the first object, the edit-target object is snapped using the arrangement information on the second object, which is the object already arranged on the second page.

3. The information processing method according to claim 1, wherein the arrangement information includes information on a position and a size where the object is arranged, or information on a margin region between an edge of the page where the object is arranged and the object.

4. The information processing method according to claim 3, wherein the information on the margin region between the edge of the page where the object is arranged and the object includes information on a margin region of a binding portion in a center of the page.

5. The information processing method according to claim 1, wherein, in the snapping, snapping is performed by matching attributes, including position and size, with the second object, which is the object already arranged on the second page, based on the arrangement information.

6. The information processing method according to claim 5, wherein the attributes include information on a filter or a rotational angle applied to the object.

7. The information processing method according to claim 1, further comprising notifying the second page as a snapping reference source, if snapping is performed, based on the arrangement information on the object already arranged on the second page.

8. The information processing method according to claim 7, wherein, in the notifying, the notification is performed by highlighting and displaying, on a display device, the second page as the snapping reference source in a page list.

9. The information processing method according to claim 1, further comprising switching the page used in the snapping if there are a plurality of the second pages as the snapping reference source.

10. The information processing method according to claim 1, further comprising, if there are a plurality of second pages, as the snapping reference source, fixing the page as the snapping reference source among the plurality of the second pages in a case when snapping is performed in the snapping, based on the arrangement information on the object already arranged on the second page.

11. The information processing method according to claim 10, further comprising, if the fixed page, as the snapping reference source is fixed in the fixing, displaying, in the first page being edited, a guide having the same position and size as the object arranged on the fixed page.

12. An information processing method comprising:
    obtaining arrangement information on an object already arranged on a second page, which is a page different from a first page being edited, wherein, in the obtaining, if there is a first object that is already arranged on the first page, the obtaining obtains arrangement information on the first object;
    snapping an edit-target object on the first page based on the obtained arrangement information on the object, wherein, in the snapping, if snapping is possible based on the information on the first object, the edit-target object is snapped, based on the arrangement information on the first object, without using the arrangement information on a second object, which is the object already arranged on the second page;
    arranging an empty frame in the first page by copying information, excluding substantial information on the object, among the obtained arrangement information on the object, to the first page; and
    displaying a guide for the empty frame if the first page is being edited.

13. The information processing method according to claim 12, wherein the arrangement information includes at least one piece of information from a position, a size, a rotational angle, and a filter of the object.

14. An information processing apparatus comprising:
    an obtaining unit configured to obtain arrangement information on an object already arranged on a second page, which is a page different from a first page being edited, wherein, if there is a first object that is already arranged on the first page, the obtaining unit obtains arrangement information on the first object; and a snapping unit configured to snap an edit-target object in the first page based on the obtained arrangement information on the object, wherein, if snapping is possible based on the information on the first object, the snapping unit snaps the edit-target object, based on the arrangement information on the first object, without using the arrangement information on a second object, which is the object already arranged on the second page.

15. An information processing apparatus comprising:

an obtaining unit configured to obtain arrangement information on an object already arranged on a second page, which is a page different from a first page being edited, wherein, if there is a first object that is already arranged on the first page, the obtaining unit obtains arrangement information on the first object;

a snapping unit configured to snap an edit-target object in the first page based on the obtained arrangement information on the object, wherein, if snapping is possible based on the information on the first object, the snapping unit snaps the edit-target object, based on the arrangement information on the first object, without using the arrangement information on a second object, which is the object already arranged on the second page;

an arranging unit configured to arrange an empty frame in the first page by copying information excluding substantial information on the object, among the obtained arrangement information on the object, to the first page; and a display controlling unit configured to display a guide for the empty frame if the first page is being edited.

16. A non-transitory computer readable storage medium storing a program causing a computer to execute an information processing method comprising:

obtaining arrangement information on an object already arranged on a second page, which is a page different from a first page being edited, wherein, in the obtaining, if there is a first object that is already arranged on the first page, the obtaining obtains arrangement information on the first object; and snapping an edit-target object on the first page based on the obtained arrangement information on the object, wherein, in the snapping, if snapping is possible based on the information on the first object, the edit-target object is snapped, based on the arrangement information on the first object, without using the arrangement information on a second object, which is the object already arranged on the second page.

17. A non-transitory computer readable storage medium storing a program causing a computer to execute an information processing method comprising:

obtaining arrangement information on an object already arranged on a second page, which is a page different from a first page being edited, wherein, in the obtaining, if there is a first object that is already arranged on the first page, the obtaining obtains arrangement information on the first object;

snapping an edit-target object on the first page based on the obtained arrangement information on the object, wherein, in the snapping, if snapping is possible based on the information on the first object, the edit-target object is snapped, based on the arrangement information on the first object, without using the arrangement information on a second object, which is the object already arranged on the second page;

arranging an empty frame in the first page by copying information excluding substantial information on the object, among the obtained arrangement information on the object, to the first page; and displaying a guide for the empty frame if the first page is being edited.

* * * * *